US010160497B2

(12) United States Patent
Wimpfheimer et al.

(10) Patent No.: US 10,160,497 B2
(45) Date of Patent: Dec. 25, 2018

(54) ALL TERRAIN VEHICLE

(75) Inventors: Cory A. Wimpfheimer, Greenbush, MN (US); Jeremy J. Utke, Roseau, MN (US); Matthew M. Kvien, Roseau, MN (US); Jeff S. Lovold, Roseau, MN (US); Jamie D. Omdahl, Roseau, MN (US); Timothy S. Wysocki, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 13/362,889

(22) Filed: Jan. 31, 2012

(65) Prior Publication Data

US 2012/0193163 A1    Aug. 2, 2012

Related U.S. Application Data

(60) Provisional application No. 61/438,452, filed on Feb. 1, 2011, provisional application No. 61/438,433, filed on Feb. 1, 2011, provisional application No. 61/438,538, filed on Feb. 1, 2011.

(51) Int. Cl.
*B62D 21/18*   (2006.01)
*B60G 3/20*    (2006.01)
*B60K 17/348*  (2006.01)

(52) U.S. Cl.
CPC ............. *B62D 21/183* (2013.01); *B60G 3/20* (2013.01); *B60G 2200/144* (2013.01); *B60G 2300/13* (2013.01); *B60K 17/348* (2013.01)

(58) Field of Classification Search
CPC .. B62K 2005/001; B62D 7/163; B62D 7/167; B62D 21/00; B62D 7/166; B62D 7/16; B62L 2005/001

USPC .................. 180/908, 435–438; 280/756
See application file for complete search history.

(56) References Cited

U.S. PATENT DOCUMENTS

| | | | | |
|---|---|---|---|---|
| 1,521,976 A | * | 1/1925 | Swain ................. | G05G 1/405 |
| | | | | 74/562 |
| 2,624,592 A | * | 1/1953 | MacPherson ................. | 180/359 |
| 2,660,449 A | * | 11/1953 | MacPherson ................. | 280/124.149 |
| 3,400,607 A | * | 9/1968 | Smith ................. | B60T 7/06 |
| | | | | 74/512 |

(Continued)

OTHER PUBLICATIONS

International Search Report and Written Opinion for PCT/US2014/019952, dated May 16, 2014, 11 pages.

(Continued)

*Primary Examiner* — Joseph M Rocca
*Assistant Examiner* — Conan D Duda
(74) *Attorney, Agent, or Firm* — Faegre Baker Daniels LLP

(57) ABSTRACT

An ATV is disclosed having a frame, a seat supported by the frame, front and rear wheels supporting the frame, a drivetrain supported by the frame, and an operator's compartment extending generally between the seat and a front enclosure. The front enclosure extends forwardly to a position proximate an axial centerline of the front wheels. Front lower alignment arms have an inner end and an outer end. Front struts have a shock absorber and a hub portion, where the front struts are coupled to the front lower alignment arms at a lower end of the front struts and the frame at an upper end. A steering mechanism is positioned forward of the axial centerline of the front wheels and is coupled to the front struts.

37 Claims, 45 Drawing Sheets

(56) References Cited

U.S. PATENT DOCUMENTS

| | | | | |
|---|---|---|---|---|
| 4,159,835 | A * | 7/1979 | Leja | B60R 21/131 |
| | | | | 280/756 |
| 4,699,234 | A * | 10/1987 | Shinozaki et al. | 180/233 |
| 4,714,126 | A * | 12/1987 | Shinozaki et al. | 180/233 |
| 4,798,399 | A * | 1/1989 | Cameron | B60R 21/13 |
| | | | | 280/304.3 |
| 4,924,959 | A * | 5/1990 | Handa et al. | 180/297 |
| 5,063,811 | A * | 11/1991 | Smith | B60K 26/02 |
| | | | | 200/61.89 |
| 5,078,223 | A * | 1/1992 | Ishiwatari et al. | 180/68.1 |
| 5,086,858 | A * | 2/1992 | Mizuta | B60K 11/06 |
| | | | | 123/41.56 |
| 5,129,700 | A * | 7/1992 | Trevisan | B62D 25/025 |
| | | | | 296/193.03 |
| 5,251,713 | A * | 10/1993 | Enokimoto | 180/68.4 |
| 5,327,989 | A * | 7/1994 | Furuhashi et al. | 180/248 |
| 5,401,056 | A * | 3/1995 | Eastman | B60G 3/20 |
| | | | | 280/785 |
| 5,855,386 | A * | 1/1999 | Atkins | 280/124.111 |
| 5,975,573 | A * | 11/1999 | Belleau | B62D 3/12 |
| | | | | 280/771 |
| 6,203,043 | B1 * | 3/2001 | Lehman | 280/288.1 |
| 6,301,993 | B1 * | 10/2001 | Orr | B60K 23/02 |
| | | | | 74/512 |
| 6,334,269 | B1 * | 1/2002 | Dilks | 37/235 |
| 6,523,634 | B1 * | 2/2003 | Gagnon et al. | 180/291 |
| 6,732,830 | B2 * | 5/2004 | Gagnon et al. | 180/291 |
| 6,799,781 | B2 * | 10/2004 | Rasidescu et al. | 280/781 |
| 6,908,108 | B1 * | 6/2005 | Scarla | A63H 17/262 |
| | | | | 280/756 |
| 7,506,714 | B2 * | 3/2009 | Davis et al. | 180/89.1 |
| 7,510,199 | B2 * | 3/2009 | Nash et al. | 280/124.135 |
| 7,607,368 | B2 * | 10/2009 | Takahashi et al. | 74/501.6 |
| 7,650,959 | B2 * | 1/2010 | Kato et al. | 180/312 |
| 7,658,258 | B2 * | 2/2010 | Denney | 180/311 |
| 7,802,816 | B2 * | 9/2010 | McGuire | 280/788 |
| 7,819,220 | B2 | 10/2010 | Sunsdahl et al. | |
| 7,828,098 | B2 * | 11/2010 | Yamamoto et al. | 180/68.5 |
| 7,931,106 | B1 * | 4/2011 | Suzuki et al. | 180/89.1 |
| 7,942,447 | B2 * | 5/2011 | Davis et al. | 280/783 |
| 7,954,853 | B2 * | 6/2011 | Davis et al. | 280/783 |
| 8,191,930 | B2 * | 6/2012 | Davis et al. | 280/783 |
| 8,382,125 | B2 | 2/2013 | Sunsdahl et al. | |
| 8,596,405 | B2 | 12/2013 | Sunsdahl et al. | |
| 8,708,359 | B2 * | 4/2014 | Murray | 280/124.148 |
| 2002/0056969 | A1 * | 5/2002 | Sawai et al. | 280/124.146 |
| 2002/0088661 | A1 * | 7/2002 | Gagnon et al. | 180/248 |
| 2004/0129489 | A1 * | 7/2004 | Brasseal et al. | 180/350 |
| 2004/0135342 | A1 | 7/2004 | Rondeau | |
| 2006/0006623 | A1 * | 1/2006 | Leclair | 280/93.512 |
| 2006/0151970 | A1 * | 7/2006 | Kaminski et al. | 280/124.134 |
| 2006/0197331 | A1 | 9/2006 | Davis | |
| 2006/0220330 | A1 * | 10/2006 | Urquidi et al. | 280/5.516 |
| 2007/0000715 | A1 | 1/2007 | Denney | |
| 2007/0257479 | A1 * | 11/2007 | Davis et al. | 280/783 |
| 2008/0023240 | A1 | 1/2008 | Sunsdahl et al. | |
| 2008/0023249 | A1 * | 1/2008 | Sunsdahl et al. | 180/312 |
| 2008/0048423 | A1 * | 2/2008 | Eriksson | B60N 3/066 |
| | | | | 280/748 |
| 2008/0053738 | A1 * | 3/2008 | Kosuge et al. | 180/311 |
| 2008/0240847 | A1 * | 10/2008 | Crouse | 403/122 |
| 2008/0303234 | A1 * | 12/2008 | Mc Cann | 280/93.511 |
| 2009/0071739 | A1 * | 3/2009 | Leonard et al. | 180/209 |
| 2009/0146119 | A1 * | 6/2009 | Bailey et al. | 254/323 |
| 2009/0183939 | A1 * | 7/2009 | Smith et al. | 180/311 |
| 2010/0012412 | A1 | 1/2010 | Deckard | |
| 2010/0059945 | A1 * | 3/2010 | Kuwabara | B60G 7/001 |
| | | | | 280/29 |
| 2011/0298189 | A1 * | 12/2011 | Schneider | B60J 5/0487 |
| | | | | 280/80.1 |
| 2012/0193163 | A1 | 8/2012 | Wimpfheimer | |
| 2013/0307243 | A1 * | 11/2013 | Ham | 280/124.134 |
| 2015/0210319 | A1 * | 7/2015 | Tiramani | B62D 21/183 |
| | | | | 280/756 |

OTHER PUBLICATIONS

International Preliminary Report on Patentability for PCT/US2012/023455, dated Apr. 2, 2013, 33 pages.

First Written Opinion for PCT/US2012/023455, dated Jun. 25, 2012, 13 pages.

International Search Report for PCT/US2012/023455, dated Jun. 25, 2012, 5 pages.

Second Written Opinion for PCT/US2012/023455, dated Jan. 17, 2013, 14 pages.

English Translation of Mexican Office Action issued by the Mexican Patent Office, dated Oct. 2016, for Mexican Patent Application No. MX/a/2013/008061, 3 pages.

Extended Search Report issued by the European Patent Office, dated Aug. 3, 2017, for European patent application No. 16198990.0; 7 pages.

Examination Report No. 1 issued by the Australian Government IP Australia; dated Jul. 11, 2017, for Australian Patent Application No. 2016238831; 3 pages.

Examination Report No. 2 issued by the Australian Government IP, dated Nov. 24, 2017, for related Australian Patent Application No. 2016238831; 3 pages.

Examination Report No. 1, issued by the Australian Government IP Australia, dated Aug. 10, 2017, for related Australian patent application No. 2016204123; 3 pages.

* cited by examiner

Fig. 9

ALL TERRAIN VEHICLE

REFERENCE TO RELATED APPLICATIONS

The Present Application claims priority to U.S. Provisional applications 61/438,452; 61/438,433; and 61/438,538; the subject matter of each being incorporated herein by reference.

BACKGROUND

The subject application relates to an all-terrain vehicle ("ATV") having improved operator area ergonomics and a roll cage surrounding the operator.

SUMMARY

ATVs are known and typically have 4 wheels supporting a frame and a straddle seat, the straddle seat may be defined for a single rider, or the straddle seat may be elongated and have a passenger position. One form of straddle frame is shown in U.S. Pat. No. 5,975,624, the subject matter of which is incorporated herein by reference. This vehicle normally has a front and rear rack for hauling various cargo. An example of such a vehicle is the Polaris Sportsman, and a 2 passenger vehicle is known as the Polaris Sportsman Touring, see also US Publication 20090195035, incorporated herein by reference.

Side by side vehicles are known in the industry and typically have 4 wheels supported by a frame, and side by seats either in bench or bucket form. This class of vehicle normally has a roll cage associated with it. This vehicle also normally has a front cargo rack and a rear cargo box or rear cargo rack. The Polaris Ranger and RZR are examples of the side by side vehicles; see also U.S. Pat. No. 7,819,220 incorporated herein by reference.

SUMMARY

In one aspect of the present disclosure, an ATV comprises a frame; a seat supported by the frame; front and rear wheels supporting the frame; a drivetrain supported by the frame, and drivingly coupled to the front and rear wheels; an operator's compartment extending generally between the seat and a front enclosure, the front enclosure extending forwardly to a position proximate an axial centerline of the front wheels; front lower alignment arms having an inner end and an outer end; front struts having a shock absorber and a hub portion, the front struts being coupled to the front lower alignment arms at a lower end of the front struts and the frame at an upper end thereof; and a steering mechanism positioned forward of the axial centerline of the front wheels and steeringly coupled to the front struts.

In another aspect, an ATV comprises a frame having generally longitudinally extending frame members, a front frame portion extending transversely across a front portion of the generally longitudinally extending frame members, the front frame portion extending beyond the generally longitudinally extending frame members to define first mounting extensions; a seat supported by the frame; front and rear wheels supporting the frame; a drivetrain supported by the frame, and drivingly coupled to the front and rear wheels; and front lower alignment arms having an inner end and an outer end, the inner end being coupled to the mounting extensions.

In yet another aspect, an ATV comprises a frame; a driver seat supported by the frame and generally aligned with the longitudinal centerline of the vehicle; front and rear wheels supporting the frame; a steering mechanism supported by the frame and coupled to the front and rear wheels for steering; a drivetrain supported by the frame, and drivingly coupled to the front and rear wheels; an operator's compartment extending generally between the seat and a front enclosure; and a protective canopy supported by the frame, at least a portion of the protective canopy extending to a position laterally beyond the inside edge of the wheels.

In a further aspect, an ATV comprises a frame; a seat supported by the frame; front and rear wheels supporting the frame; a drivetrain supported by the frame, and drivingly coupled to the front and rear wheels; a front differential coupled to the drivetrain and having drive couplings coupled to the front wheels, a centerline through the drive couplings being rearward of an axial centerline through the front wheels; front struts having a shock absorber and a hub portion; and a steering mechanism positioned forward of the axial centerline of the front wheels and steeringly coupled to the front struts.

In yet another aspect, an ATV comprises a frame having main frame members extending generally parallel to a vehicle longitudinal axis. A front frame portion has upright frame portions extending upwardly from the generally longitudinally extending frame members, and a cross frame member extending generally transverse to the vehicle longitudinal axis. A driver's seat is supported by the generally longitudinally extending frame members and generally aligned with the longitudinal centerline of the vehicle. Front and rear wheels support the frame. A steering mechanism is supported by the frame and is coupled to the front wheels for steering. A drivetrain is supported by the frame, and is drivingly coupled to the front and rear wheels. An operator's compartment extends generally between the seat and a front enclosure. A protective canopy is supported by the frame, and at least a portion of the protective canopy is supported by the cross frame member at positions laterally beyond the seat.

BRIEF DESCRIPTION OF THE DRAWINGS

The subject vehicle will be described by way of reference to the following figures, where:

FIG. 9 is a rear view of the frame of FIG. 5;

DETAILED DESCRIPTION

Figure 1:
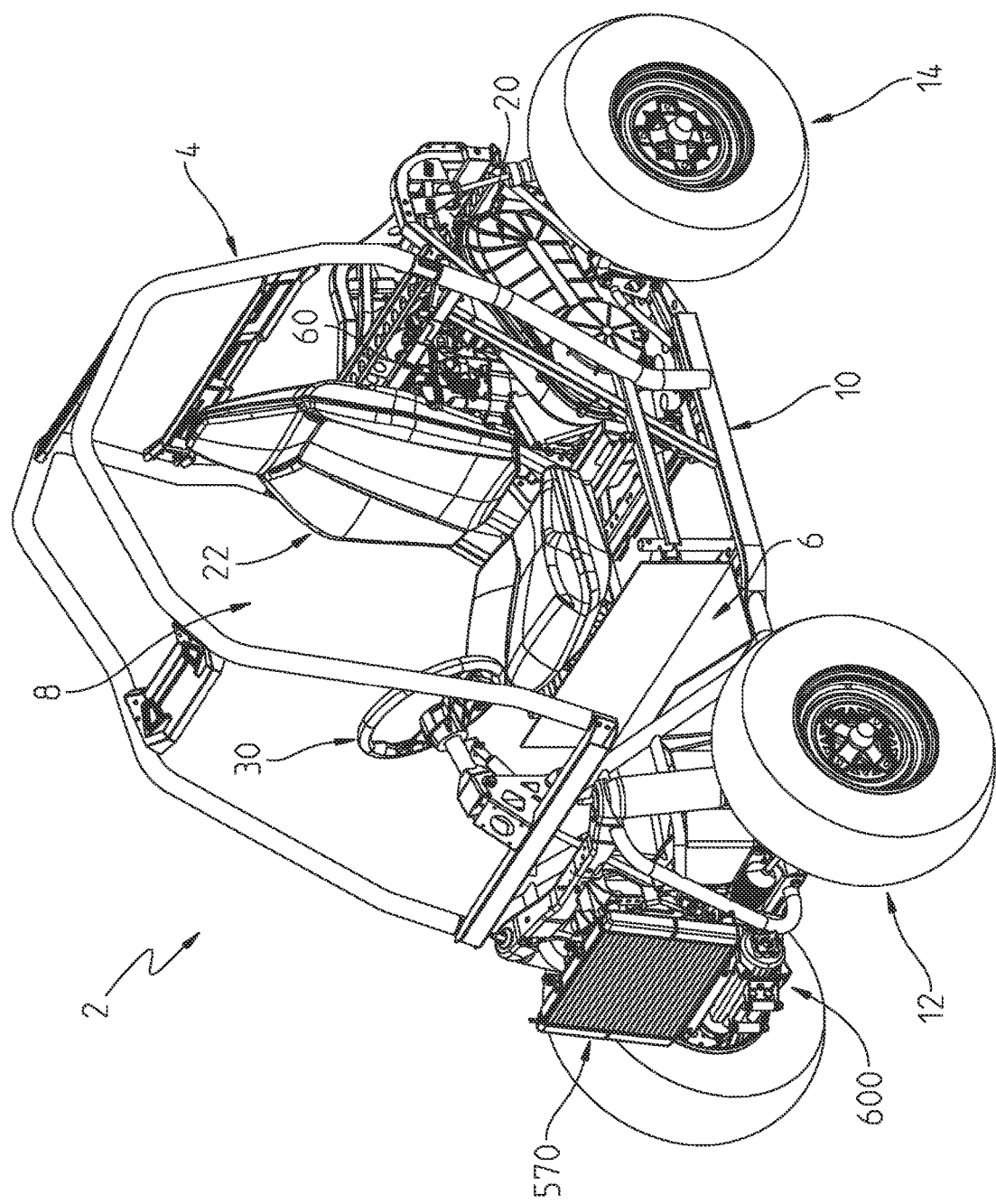
FIG. 1 is a front left perspective view of the vehicle of the present disclosure.

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 2:
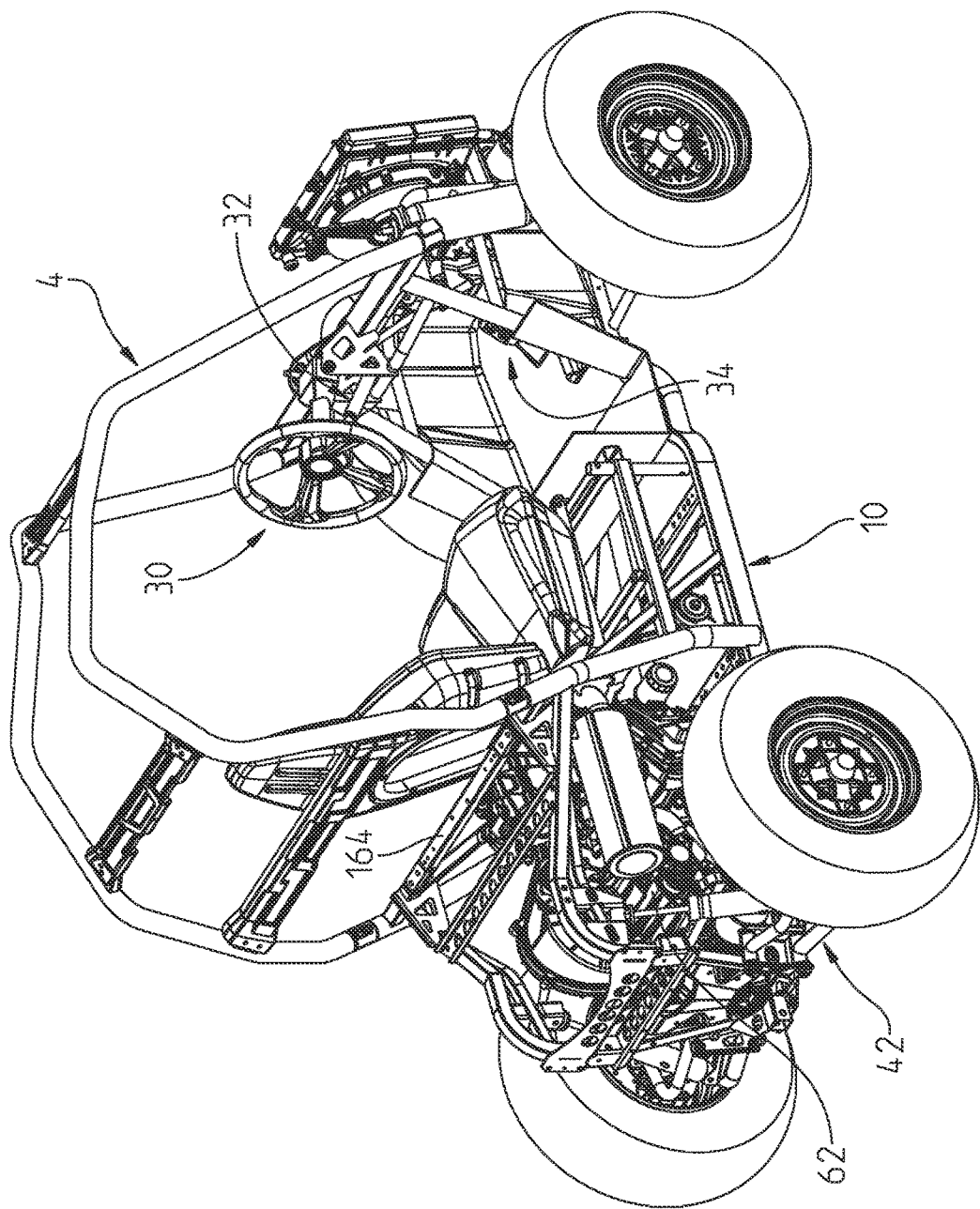
FIG. 2 is a right rear perspective view of the vehicle of FIG. 1.
Figure 3:
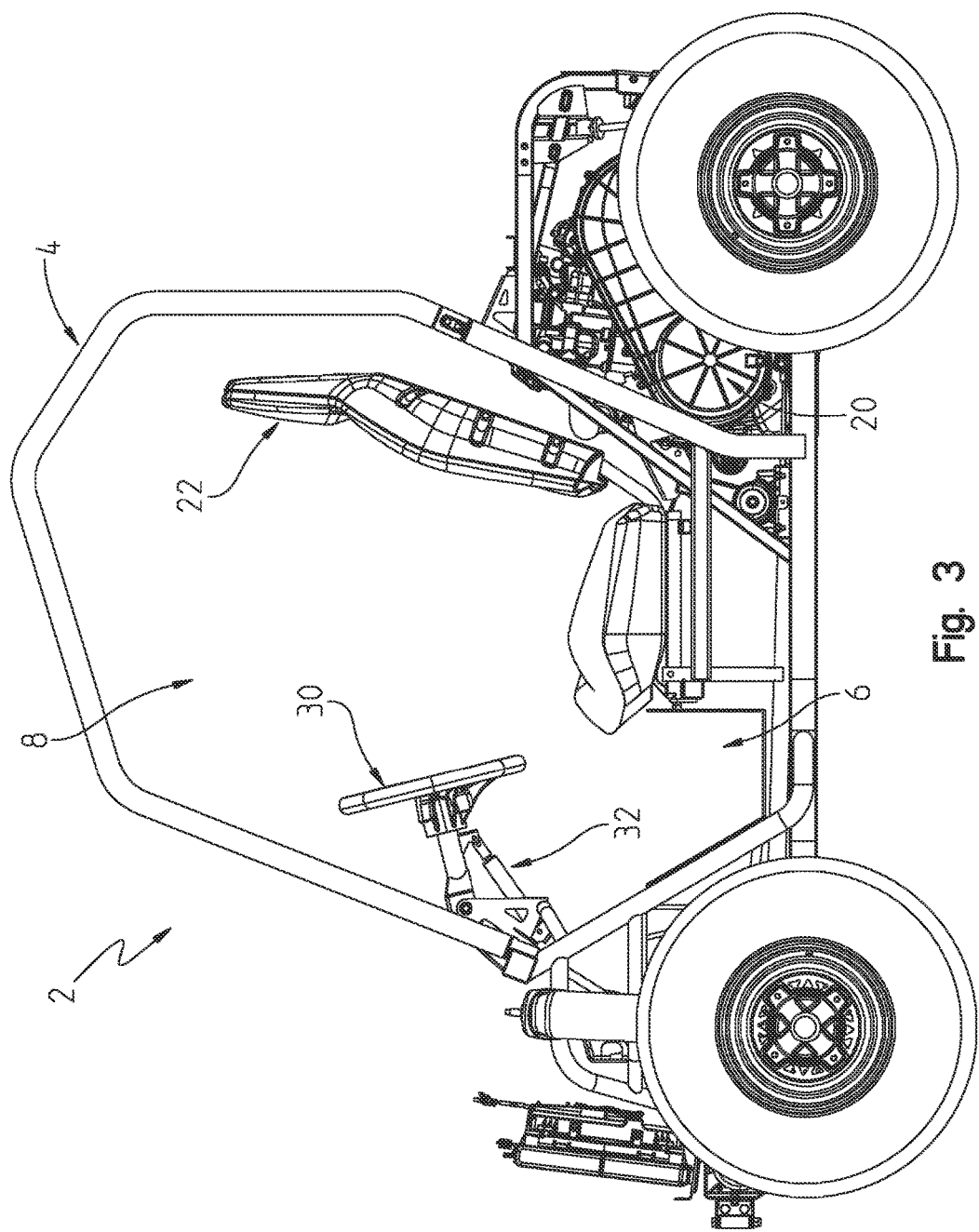
FIG. 3 is a left side view of the vehicle of FIG. 1.

With reference first to FIGS. 1-4, the general nature of the vehicle will be described. As shown, vehicle 2 is an all-terrain vehicle ("ATV") for a single rider having dimensions similar to those of the Polaris Sportsman XP vehicle. That is, the wheel base of ATV 2 (the longitudinal distance between the center of wheels 12, 14) is between 60 and 65 inches in length, and in the embodiment shown in 62 inches. However as vehicle 2 includes a roll cage structure 4, the vehicle includes a walk through opening at 6 as best shown in FIG. 3, accessing an operator's area 8. With that background, the vehicle will be described in greater detail.

As shown in FIG. 1, vehicle 2 includes a frame 10, supported by front wheels 12 and rear wheels 14. Frame 10 generally supports a powertrain 20 as well as a single seat 22 shown in the form of a bucket seat. The bucket seat 22 may take the form of the seat in the vehicle known as the Polaris RZR, which is also shown in U.S. Pat. No. 7,819,220, mentioned above, the subject matter of which is incorporated herein by reference.

Figure 4:
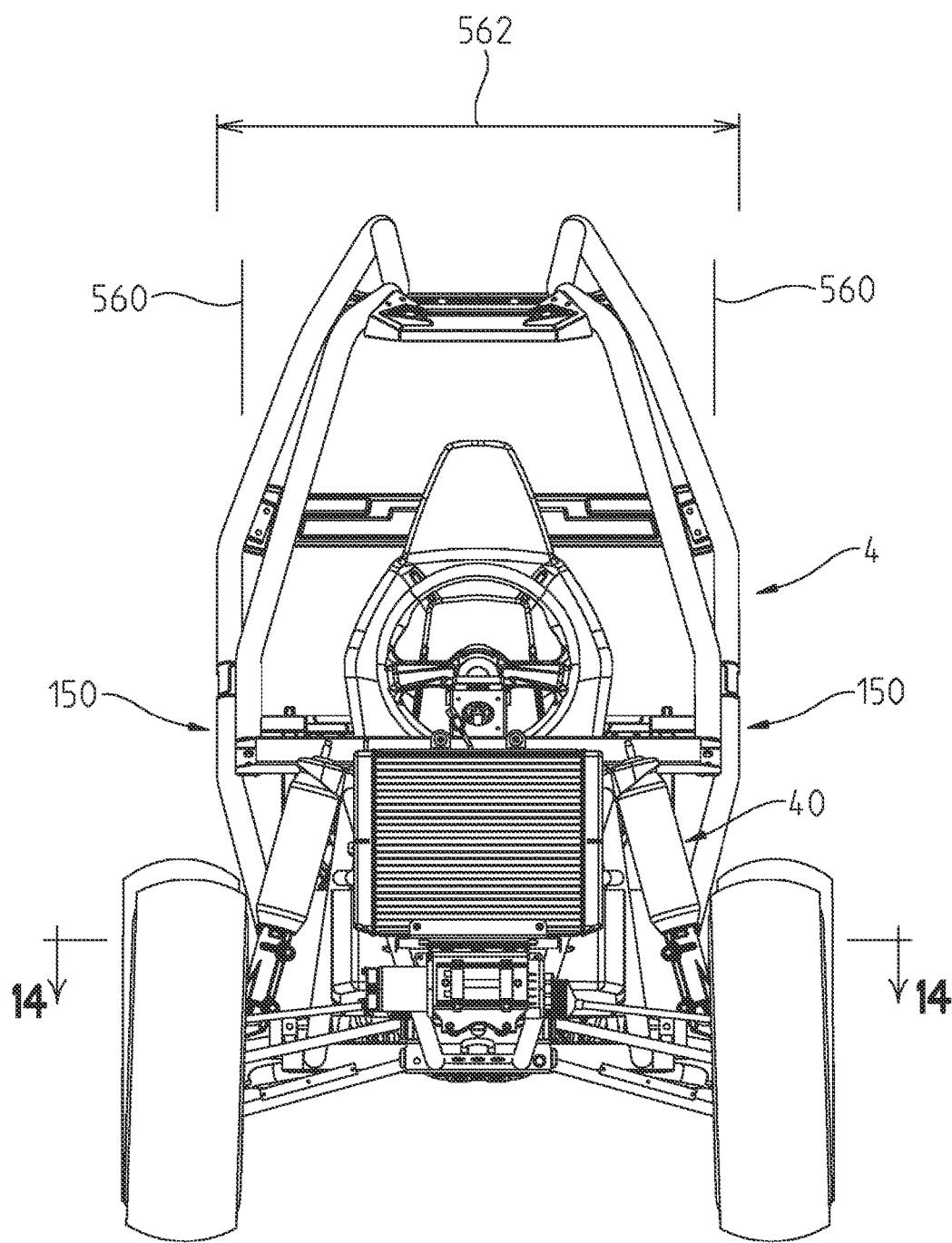
FIG. 4 is a front view of the vehicle of FIG. 1.

As shown in FIG. 2, the vehicle may be steered by a steering wheel 30 which is adjustable by adjustment mechanism 32. Alternatively, vehicle 2 may be steered by a handlebar as is known by the Polaris Sportsman XP referred to above. In terms of vehicle speed controls, vehicle 2 may have operator controls 34 in the form of an accelerator pedal and a brake pedal similar to that of the Polaris RZR vehicle, or the vehicle may have vehicle speed controls by way of a thumb throttle and hand brakes on the handlebar as known by the Polaris Sportsman XP. As also shown in FIGS. 2 and 4, ATV 2 includes a front suspension 40 and a rear suspension 42. With the ATV 2 as generally described, the ATV 2 will be described in greater detail.

Figure 5:
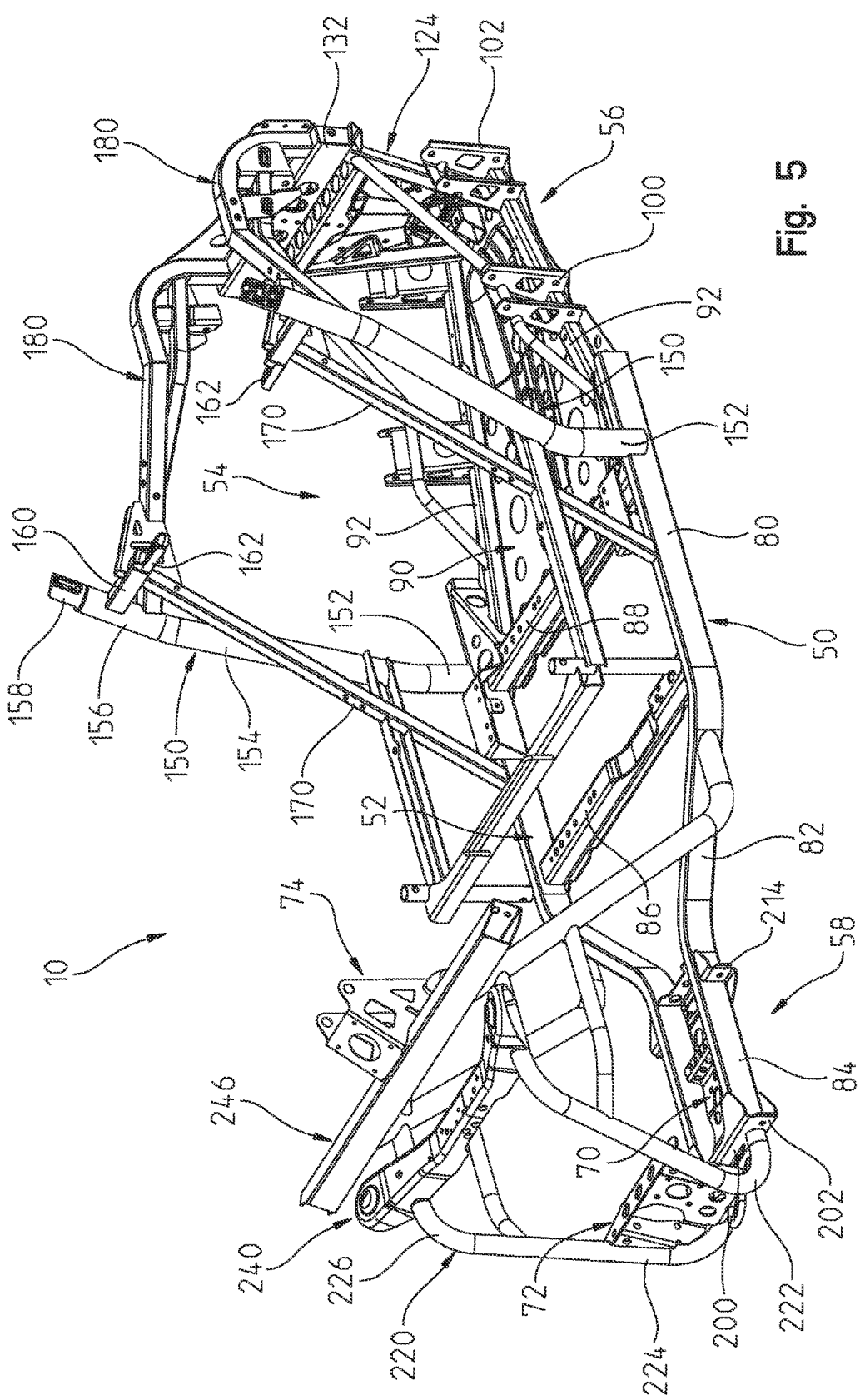
FIG. 5 is a front left perspective view of the frame of the vehicle of FIGS. 1-4.

With reference now to FIGS. 5-9, frame 10 will be described in greater detail. As shown best in FIGS. 5 and 6, frame 10 is comprised of frame tubes 50 and 52, which extend generally longitudinally and define the main structure for ATV 2. Frame 10 includes an engine and transmission mount portion 54, a rear suspension mount portion 56 and front suspension mount portion shown generally at 58. As shown, frame 10 mounts an engine 60 (FIG. 1) and transmission 62 (FIG. 2) to mount portion 54. Engine 60 is of the type shown and described in either of Assignee's Ser. No. 13/242,229 or 13/242,239 both of which were filed on Sep. 23, 2011, the subject matter of which is incorporated herein by reference. Transmission 62, and the mounting of the engine and transmission together, as well as the mounting of the engine 90 and transmission 62 to frame 10 is similar to that shown in either of U.S. patent application Ser. Nos. 12/849,480 or 12/849,516, both of which were filed on Aug. 3, 2010, the subject matter of which is incorporated herein by reference. Frame 10 further includes a front differential mount portion 70, a steering mechanism mount portion 72 and a steering post mount portion 74, all of which are shown in FIG. 5.

As shown in FIG. 5, frame tubes 50 and 52 are mirror images of each other, and therefore will be discussed having similar components. Frame tubes 50, 52 include tube portions 80, transition tube portions 82 and front tube portions 84. Cross frame portions 86 and 88, in the form of channels, extend between and connect the tube portions 80. A frame pan 90 extends from and is interconnected to frame tube portions 80 and cross frame portion 88, and extends generally rearwardly from the frame tubes 50, 52. Frame pan 90 extends generally parallel to frame tubes 50, 52 although frame pan 90 could extend at an angle relative thereto.

Frame pan 90 is generally trapezoidal in configuration (as best viewed in FIG. 8) and includes defined channels 92 for strengthening purposes. A clearance recess 94 is also defined as will be described further herein. As shown, frame pan 90 is a stamped and formed member from a structurally rigid material, such as steel or aluminum, but could be comprised of any structural material, such as a cast member, composite material, etc.

Rear suspension mount portion 56 is comprised of channels 100, 102 (FIGS. 5-7) mounted to the channels 92 and extend upwardly therefrom. Each of the channels 100, 102 include upper apertures 104, 108 and lower apertures 106, 110 for mounting suspension arms as shown best in FIG. 6, and as further described herein. Support tubes 120 (FIG. 7) are attached to frame pan 90 and are coupled to channels 100 to rigidify the channels and then extend rearwardly and upwardly to a rear frame panel 124.

Figure 9:
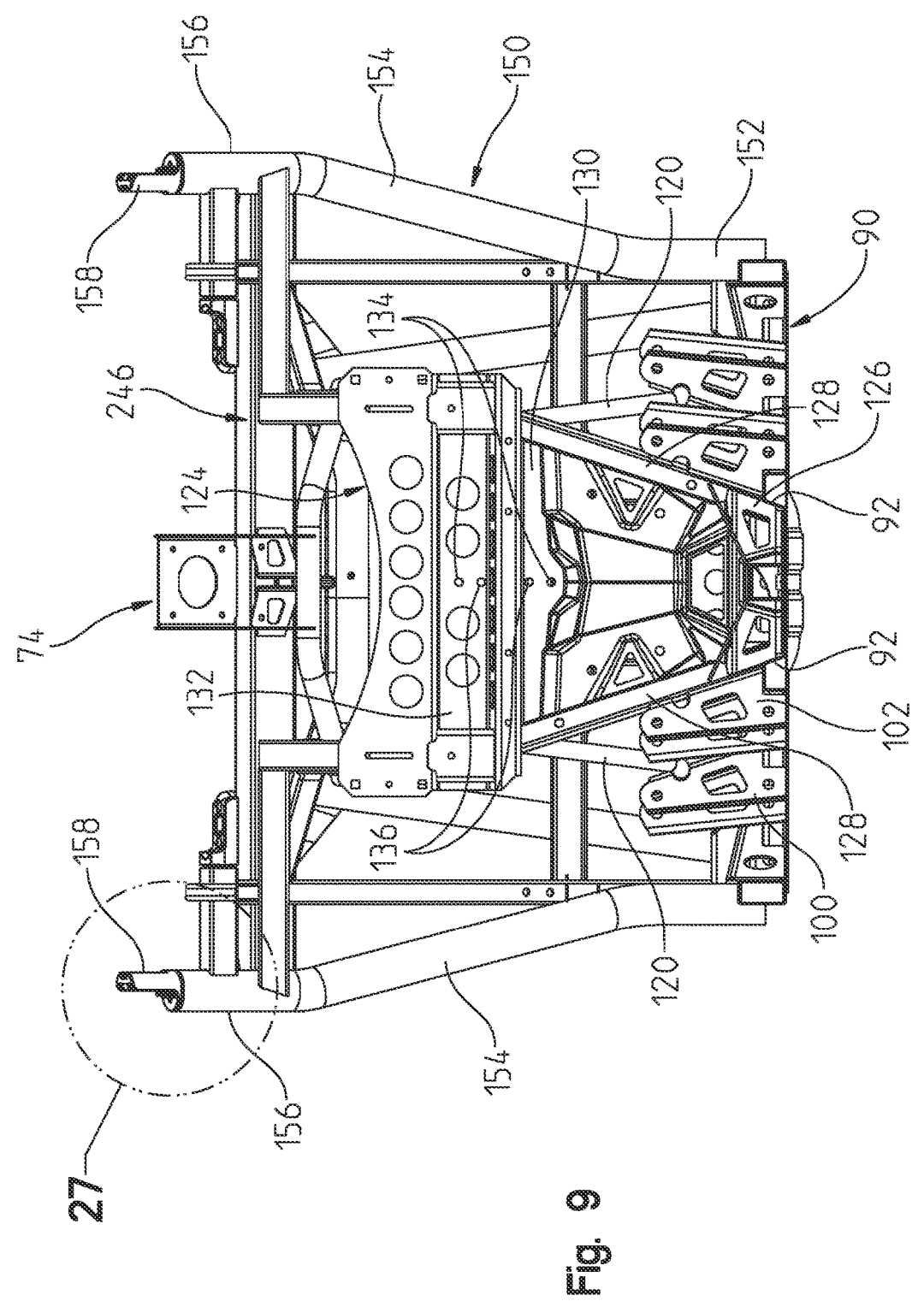

Rear frame panel 124 extends upwardly from frame pan 90 and as best shown in FIG. 9, includes a lower panel section 126 coupled to frame pan 90, and in particular, is nestled between the channels 92. Rear frame panel 124 is comprised of channel portions 128 and plate portions 130, 132 (FIGS. 6 and 9) extending between channel portions 128, the channel portions defining mounting surfaces having apertures 134 and locating apertures 136, as further described herein.

Figure 7:
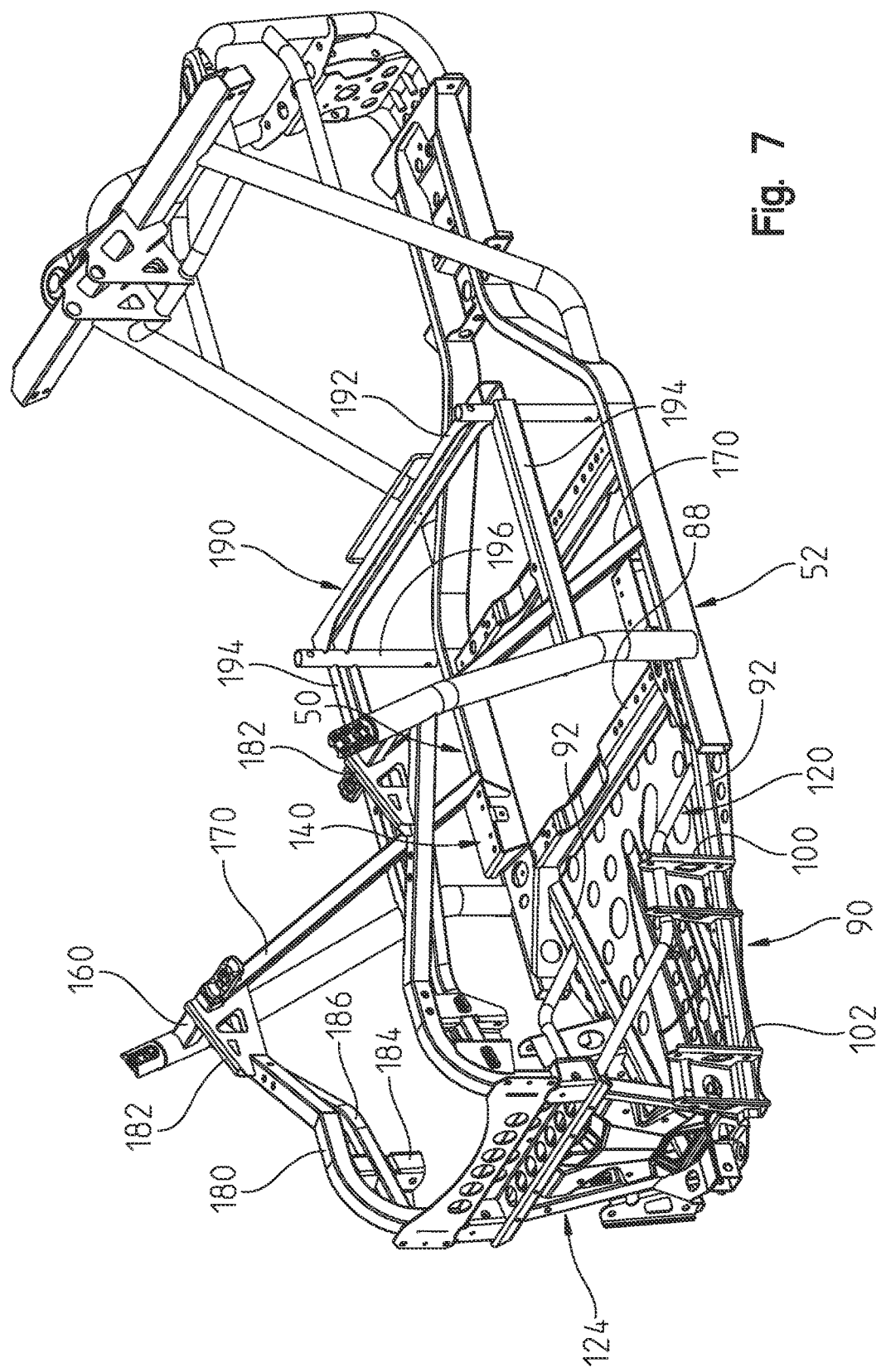
FIG. 7 is a right rear perspective view of the frame of FIG. 5.
Figure 8:
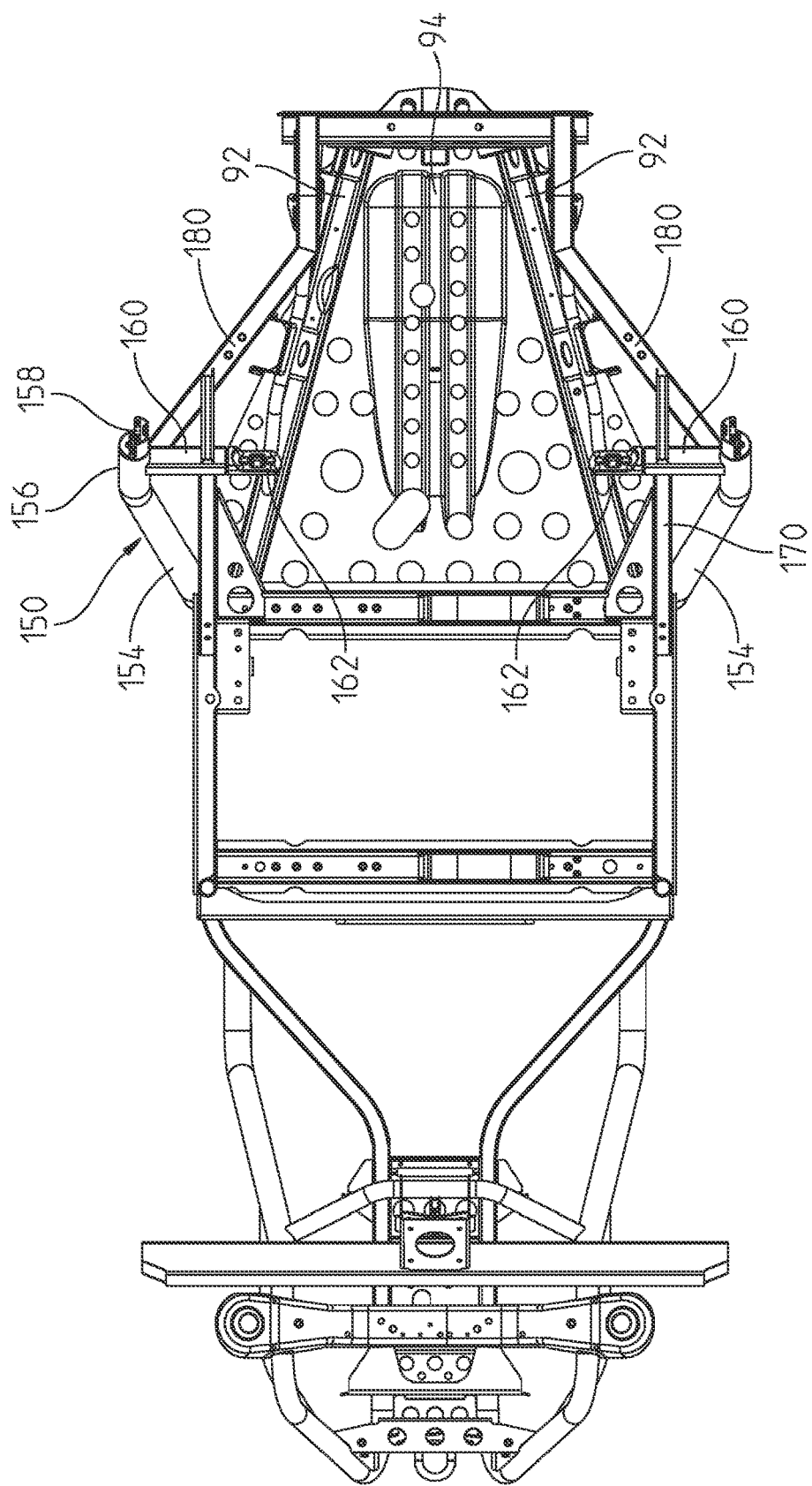
FIG. 8 is a top view of the frame of FIG. 5.
Figure 10:
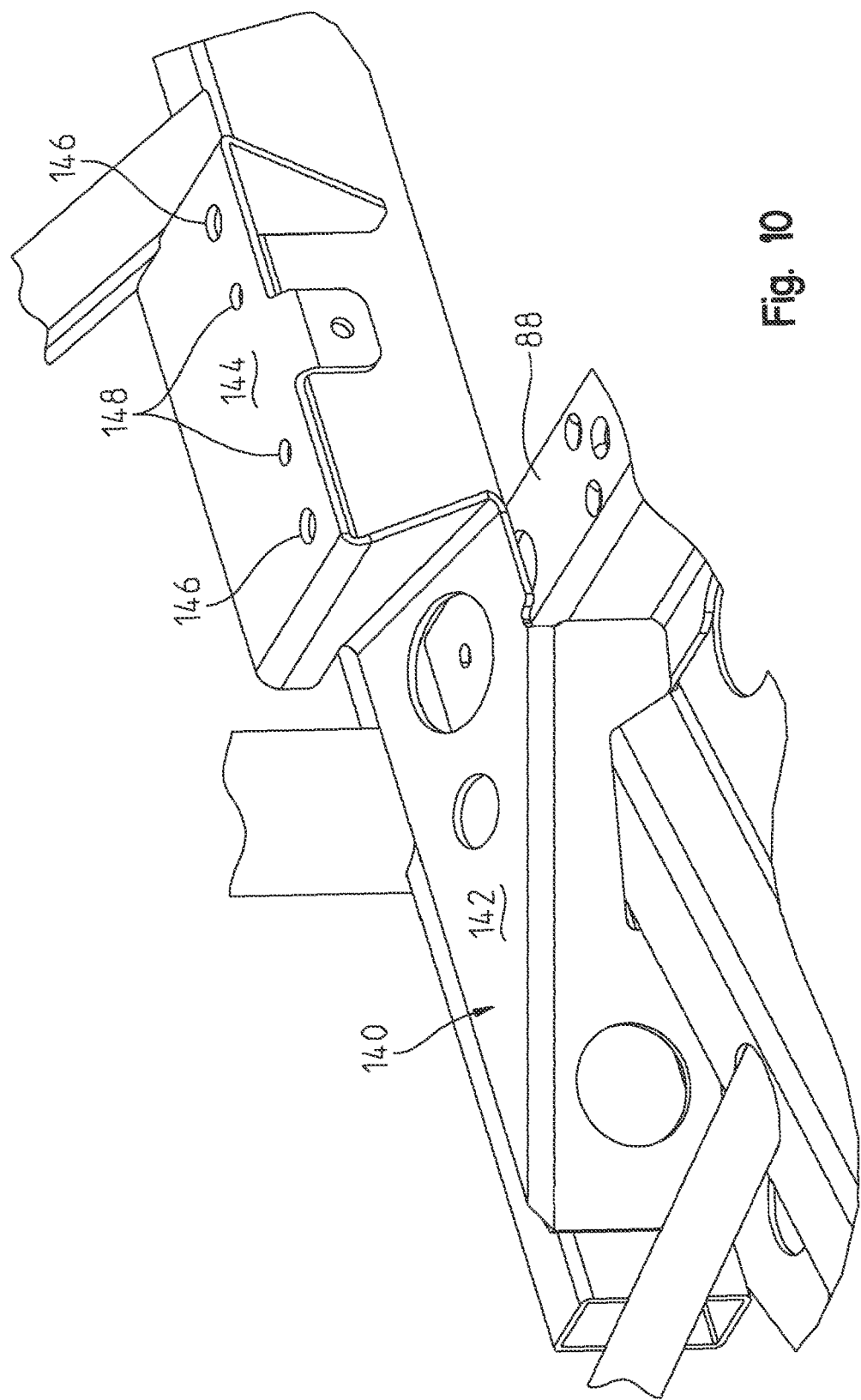
FIG. 10 is an enlarged view of the front right engine mount.
Figure 11:
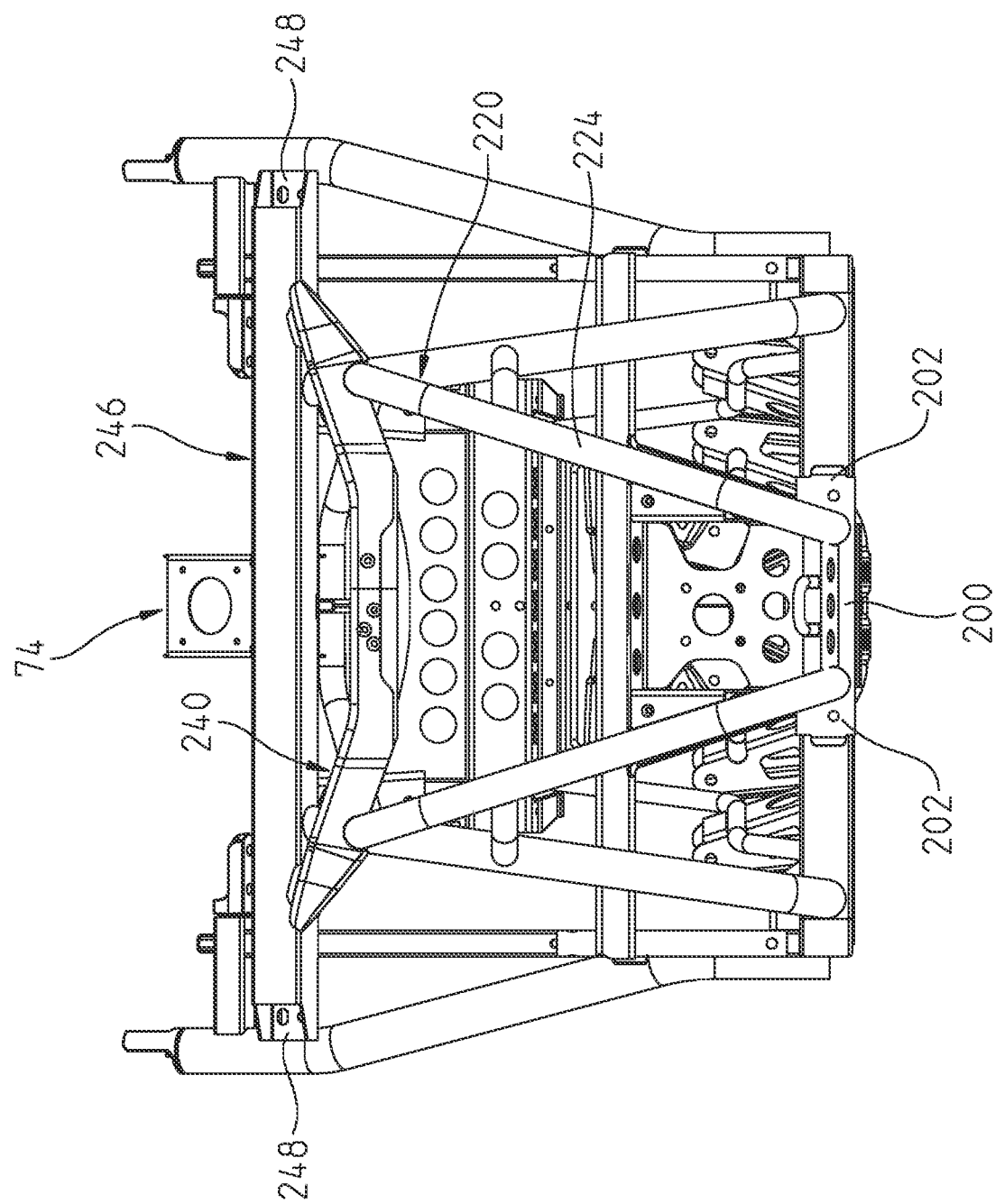
FIG. 11 shows a front view of the frame.

As shown best in FIGS. 7 and 10, front engine mounts 140 are provided on frame 10. Front engine mounts 140 include top plate portion 142 attached to cross frame portion 88, and to an inside surface of frame tube 50. Front engine mounts 140 further include an upper mounting plate 144 having mounting apertures 146 and locating apertures 148, as further described herein.

As shown best in FIG. 9, the frame 10 further includes support uprights 150 for roll cage structure 4, with lower tube portions 152 coupled to frame tubes 50, 52; transition tube portions 154 extending upwardly, rearwardly and outwardly, and further includes upper tube portions 156. Attachment inserts 158 are coupled to the upper tube portions 156, as described further herein. Frame portions 160 (FIG. 8) extend from support uprights 150 and extend transverse to a longitudinal direction of the vehicle and include mounting inserts 162. A removable frame section 164 (see FIG. 2) is removably provided for ease of installing the engine and transmission subassembly as more fully described herein.

As shown in FIG. 5, the frame 10 further comprises frame tube portions 170, extending upwardly and rearwardly from frame tubes 50, 52 and intersecting with frame portions 160. Frame tube portions 180 extend upwardly from the rear frame panel 124 and extend forwardly to intersect with the support uprights 150. Brackets 182 extend between frame portions 160, frame tube portions 170 and frame tube portions 180, as best shown in FIG. 7. Shock mounting brackets 184 (FIGS. 6 and 7) are coupled to frame tubes 186, which in turn are coupled to frame tube portions 180. Frame 10 also includes a seat frame 190 (FIG. 7) having frame portions 192, 194 and 196 as further described herein.

Figure 6:
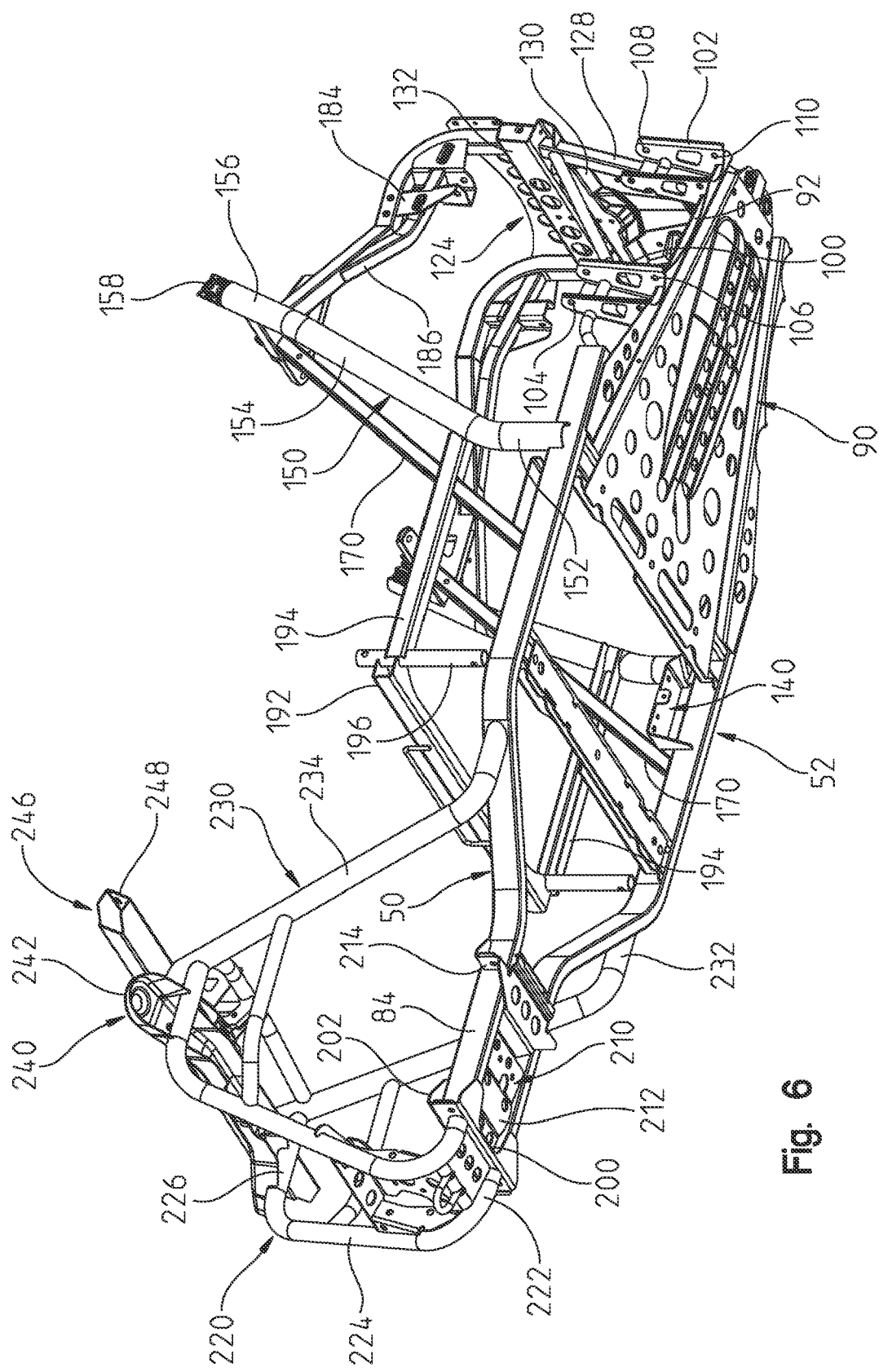
FIG. 6 is a left front under side perspective view of the frame of FIG. 5.

With reference now to FIGS. 5 and 6, front suspension mount portion 58 will be described in greater detail. As shown, frame 10 includes front frame portion 200, in the form of a channel, extending transversely across a front portion of the frame tubes 50, 52. The front frame portion 200 extends transversely beyond the frame tubes to define first mounting extensions 202. As shown best in FIG. 6, frame 10 further comprises mounting plate 210 coupled between front tube portions 84, and defines a mounting plate 212 and second mounting extensions 214. First and second mounting extensions 202, 214 are provided for mounting a lower suspension arm as further disclosed herein.

With reference still to FIGS. 5-8 and 11, frame 10 further includes U-shaped frame tubes 220 having portions 222 butted into front frame portion 200, upwardly extending portions 224 and portions 226 extending longitudinally and rearwardly. Meanwhile frame tubes 230 (FIG. 6) extend from frame tubes 50, 52 at portions 232 and then upwardly at portions 234 and intersect with frame portions 226. A shock tower 240 extends transversely across the frame portions 226, and has shock mounts at 242. A frame tube 246 extends transversely across frame portions 234 and provides support for steering post mount portion 74. Frame tube 246 also includes mounting portions 248 adjacent to the tube ends for mounting of the roll cage structure 4, as described in greater detail herein.

Figure 12:
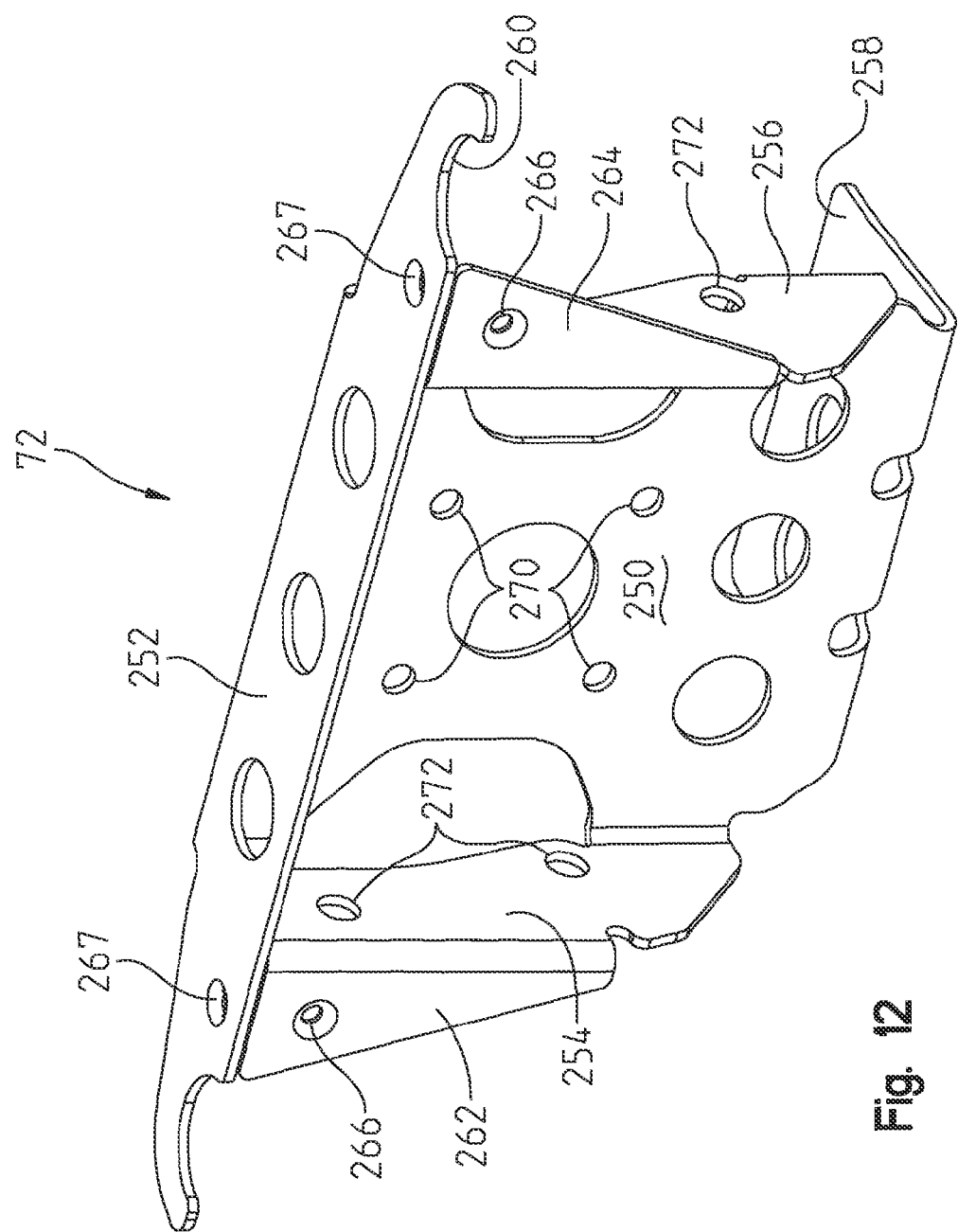
FIG. 12 shows a front left perspective view of a front bracket of the frame.

Finally, as shown in FIGS. 5 and 12, steering mechanism mount portion 72 is shown including a plate portion 250 having a plurality of plate sections 252, 254, 256 and 258 extending from the marginal edges of plate portion 250. Plate section 252 extends forwardly and has circular cutout portions 260 profiled to partially surround frame portions 224 and threaded apertures 267. Plate sections 254 and 256 further include plate flaps 262 and 264 which fit within tube portions 224, and include threaded apertures 266. Plate section 258 extends rearwardly for contact with front frame portion 200. Plate portion 250 defines a mounting surface (the back side of plate portion 250 as viewed in FIG. 12) with mounting apertures 270 for mounting a steering mechanism thereto as described further herein. Plate sections 254 and 256 include mounting apertures 272 for mounting a winch thereto as further described herein.

It should be generally understood that the frame 10 as described above is a structurally rigid member. The frame is described as having a plurality of tubes and channels, and it should be understood that these items are structurally rigid, for example steel or aluminum tubes. Many plates are also referred to and these could be stamped and formed items of steel or aluminum construction, but they could also be one piece cast items, or composite materials. In the case of the steel construction, the various items are fixed together for example by welding, but the items could also be held together by fasteners, and some items could be held together by industrial adhesives, for example as shown and described in Applicants U.S. patent application Ser. No. 13/027,116 filed Feb. 14, 2011. the subject matter of which is incorporated herein by reference.

Figure 13:
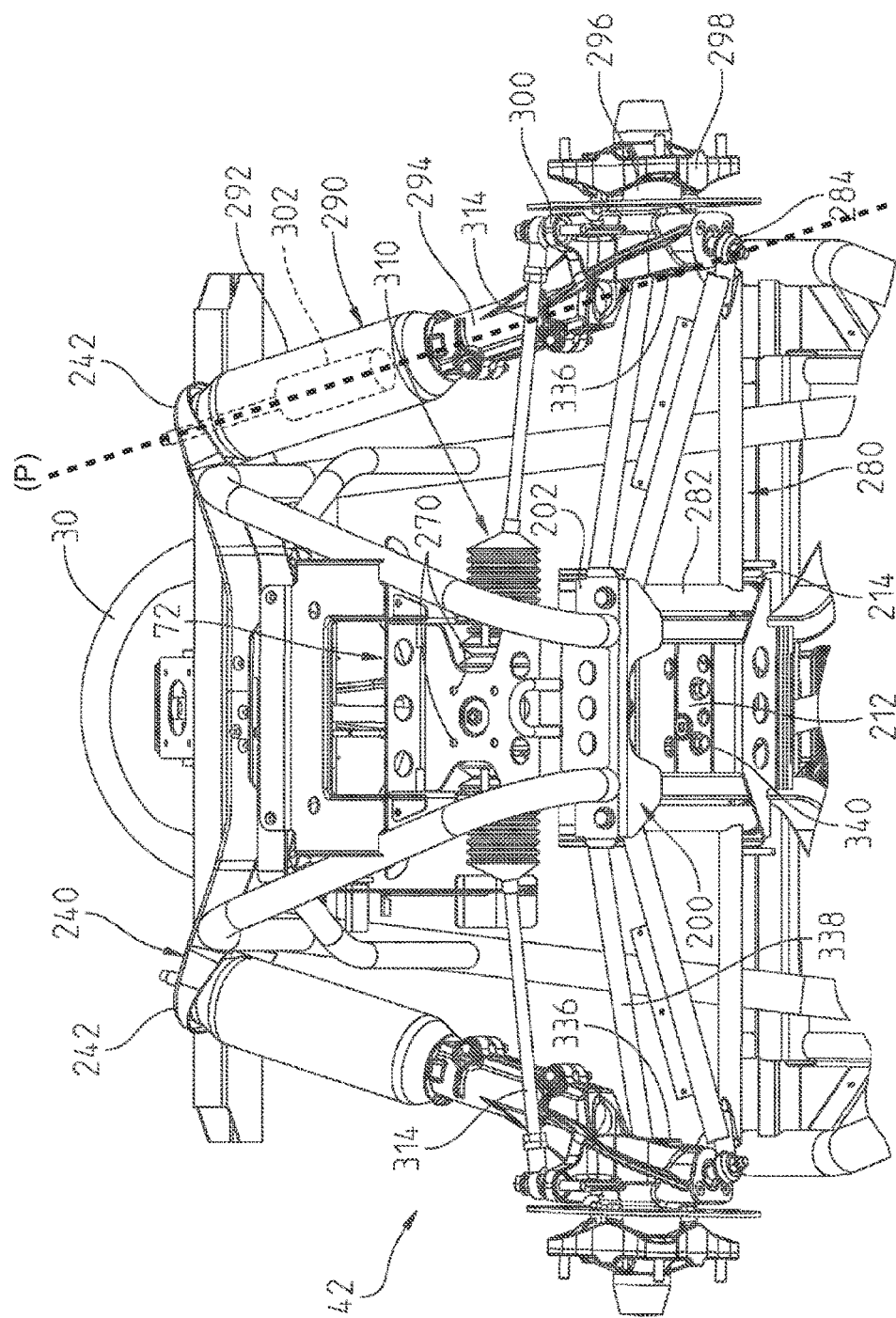
FIG. 13 is a front under side perspective view of the ATV.

With reference now to FIG. 13, front suspension 42 will be described in greater detail. As shown, front suspension 42 is comprised of lower control arms 280 (also known as A-arms) having an inner end at 282 and an outer end at 284. As shown, inner end 282 is coupled between first and second mounting extensions 202, 214. Outer end 284 of control arm 280 is defined as a ball joint and is coupled to a lower end of strut 290. As shown, strut 290 includes an upper shock absorber portion 292 and a lower steering portion 294 extending along a pivot axis (P) (see FIGS. 13 and 15). Steering portion 294 is comprised of a hub carrier 296 having a hub 298 rotatably coupled thereto. Strut steering portion 294 also includes a steering coupler at 300 as described herein. Shock absorber portion 292 of strut 290 is coupled to portion 242 of shock tower 240. Thus it should be understood that lower control arm (and wheel 12 attached to it) is movable upwardly and downwardly under the controlled resistance of an internal shock absorber 302.

Figure 14:
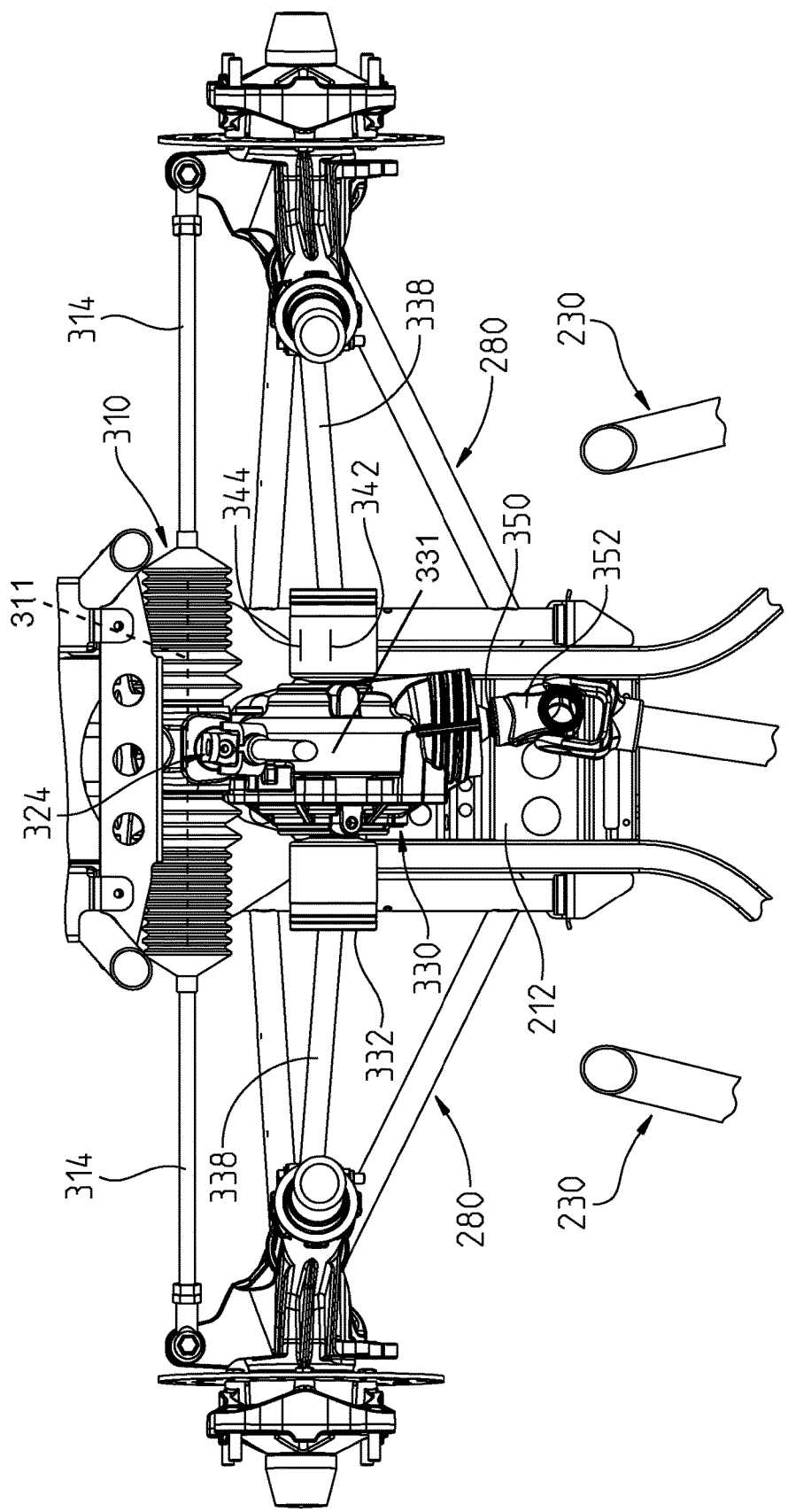
FIG. 14 is a cross-sectional view of the front differential and steering mechanism through lines 14-14 of FIG. 4.

With reference now to FIGS. 14-17, the steering assembly will be described in greater detail. With reference first to FIG. 14, the steering assembly includes a steering mechanism 310, which in the disclosed embodiment is a linear actuator, such as a rack and pinion type steering system, having an input shaft 312 (FIG. 17) with an output to steering arms 314 (FIG. 14). Steering arms 314 move in a transverse direction along a transverse actuation axis 311 of steering mechanism 310. Input to steering shaft 312 is by way of steering wheel 30 (FIG. 15) to a steering shaft 320 coupled to steering post 322. It should be understood that the connection of steering shaft 320 to steering post 322 and connection of steering post 322 to steering mechanism 310 is by way of universal joints, for example universal joint 324 shown in FIG. 15.

As mentioned above, steering wheel 30 and steering shaft 320 are pivotally connected to steering post mount portion 74, the pivoting angle being adjustable through adjustment mechanism 32. With reference again to FIG. 13, it should be appreciated that steering arms 314 are coupled to steering couplers 300 on strut 290, the steering arms 314, therefore rotating the steering portions 294 of struts 290 for steering purposes. As shown best in FIGS. 13 and 17, steering mechanism 310 is fixed to the rear surface of plate 250 fixedly coupling steering mechanism 310 to the frame 10. In particular, steering mechanism 310 is attached by way of fasteners through apertures 270 (FIG. 12).

Figure 15:
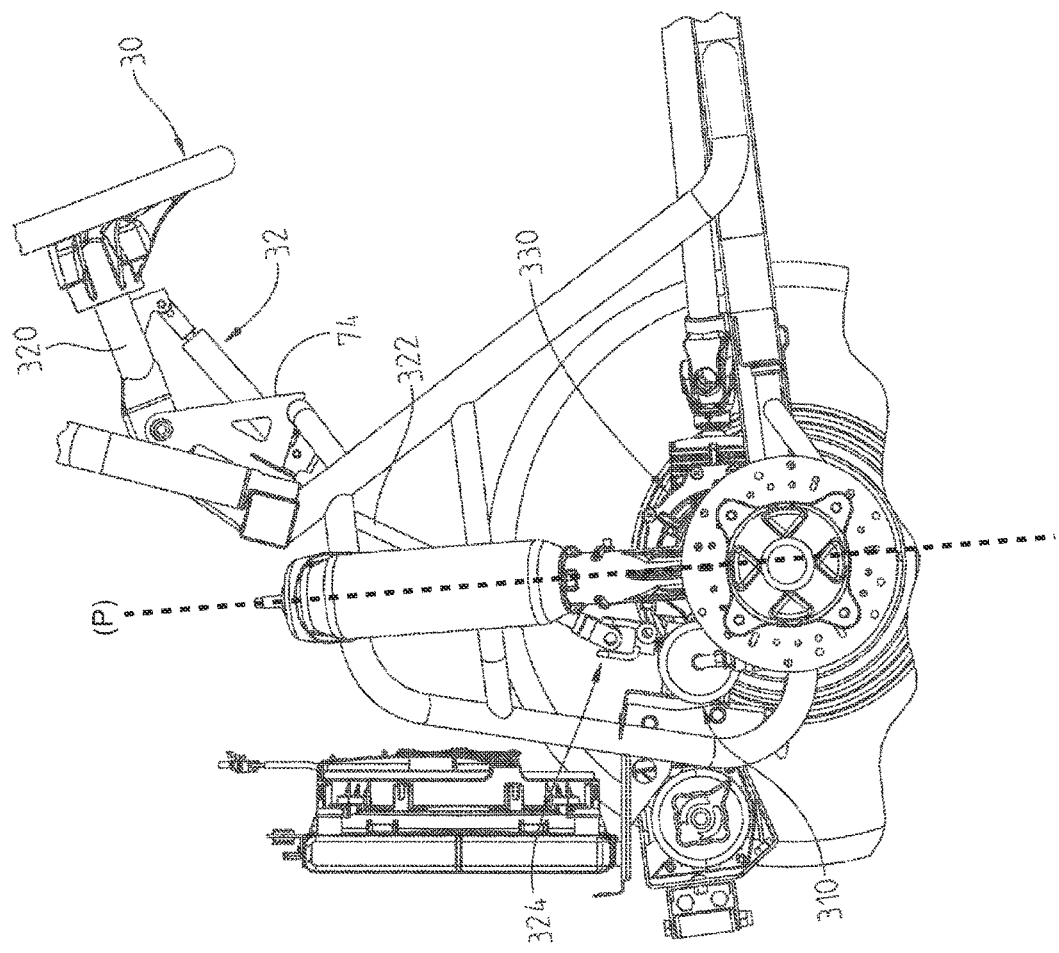
FIG. 15 is a left side view of the front portion of the ATV showing the front differential and steering mechanism.
Figure 16:
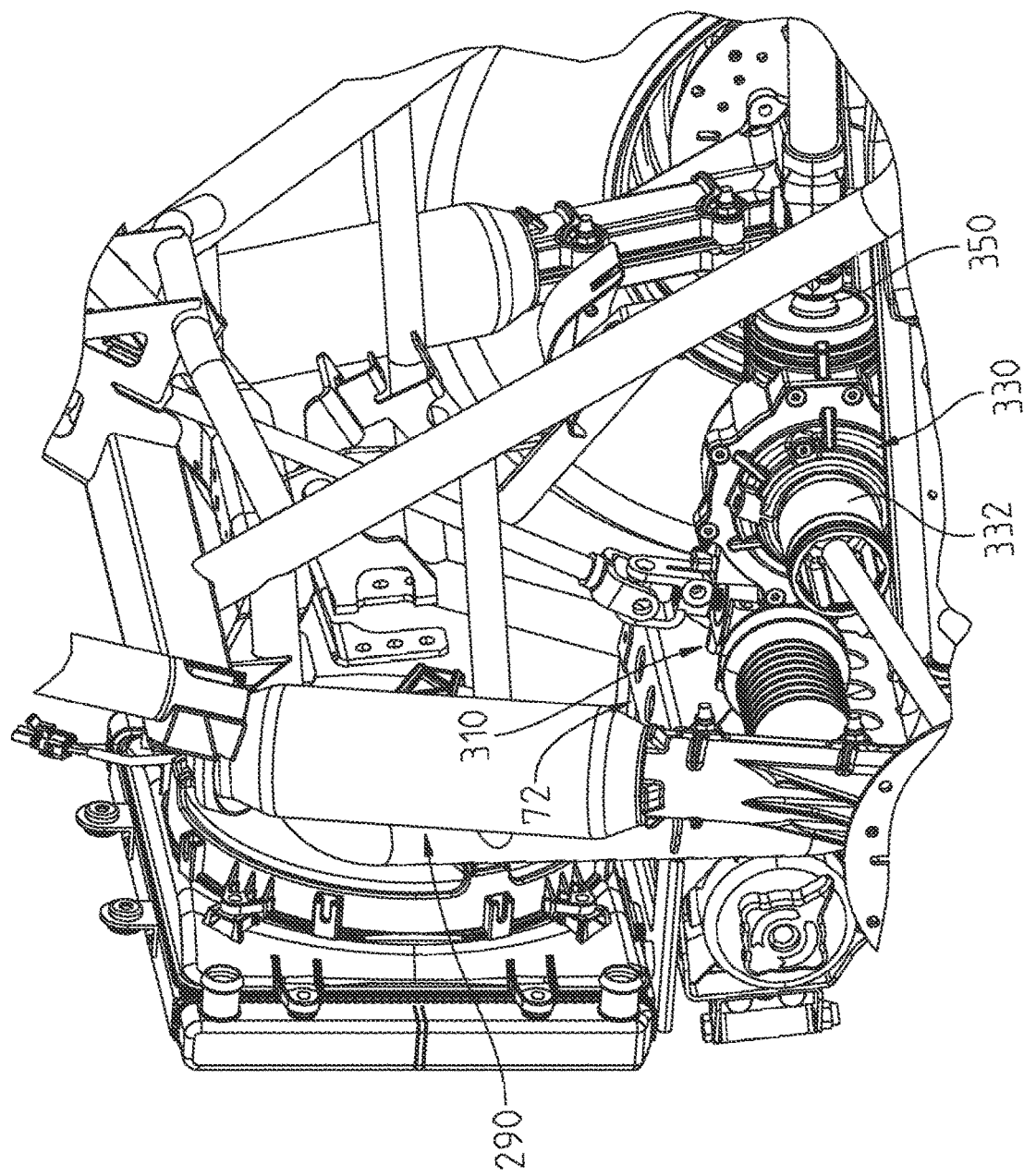
FIG. 16 is a left hand perspective view showing the front differential and steering mechanism.
Figure 17:
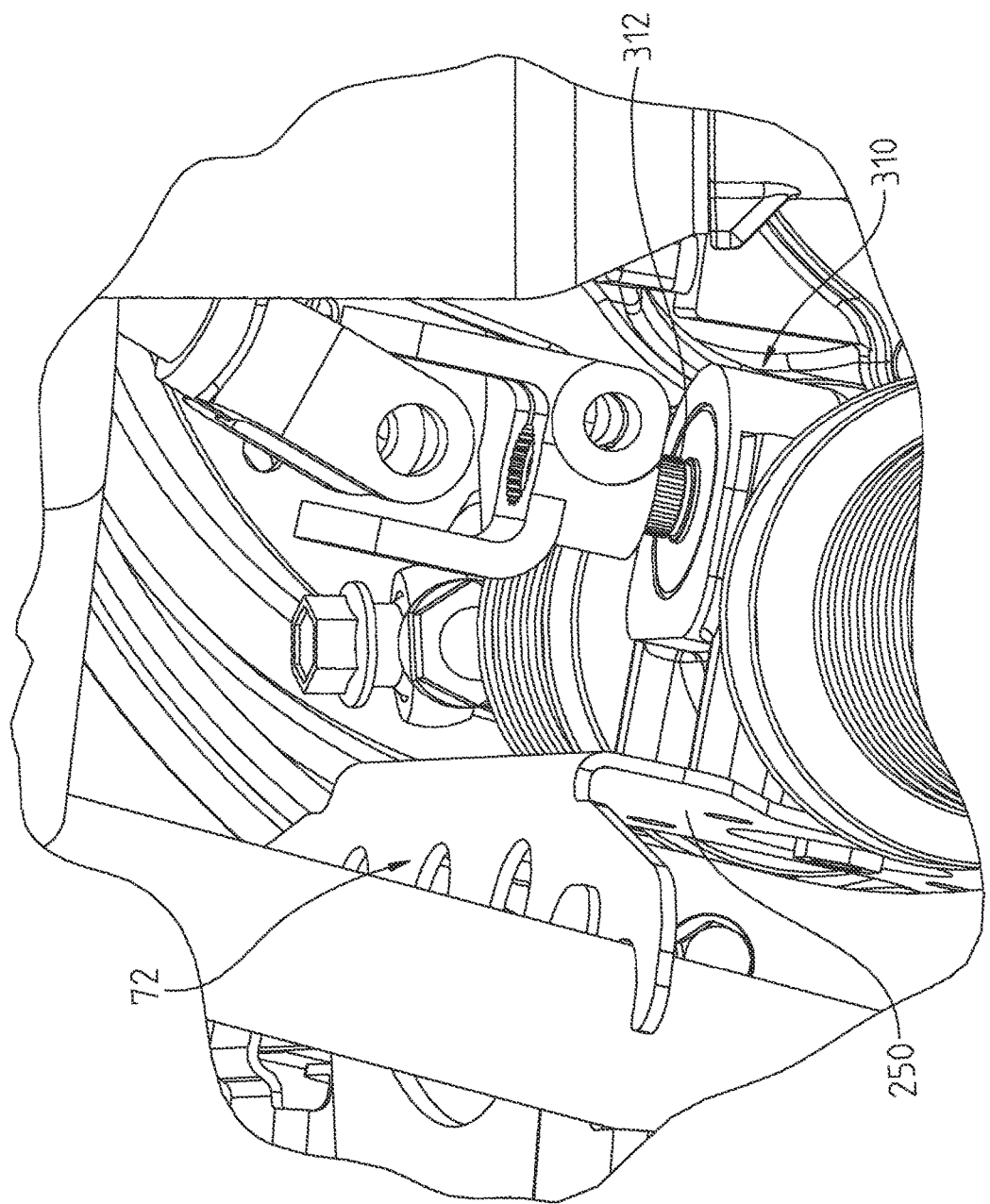
FIG. 17 is an enlarged perspective view of the steering mechanism shown in FIG. 16.
Figure 26:
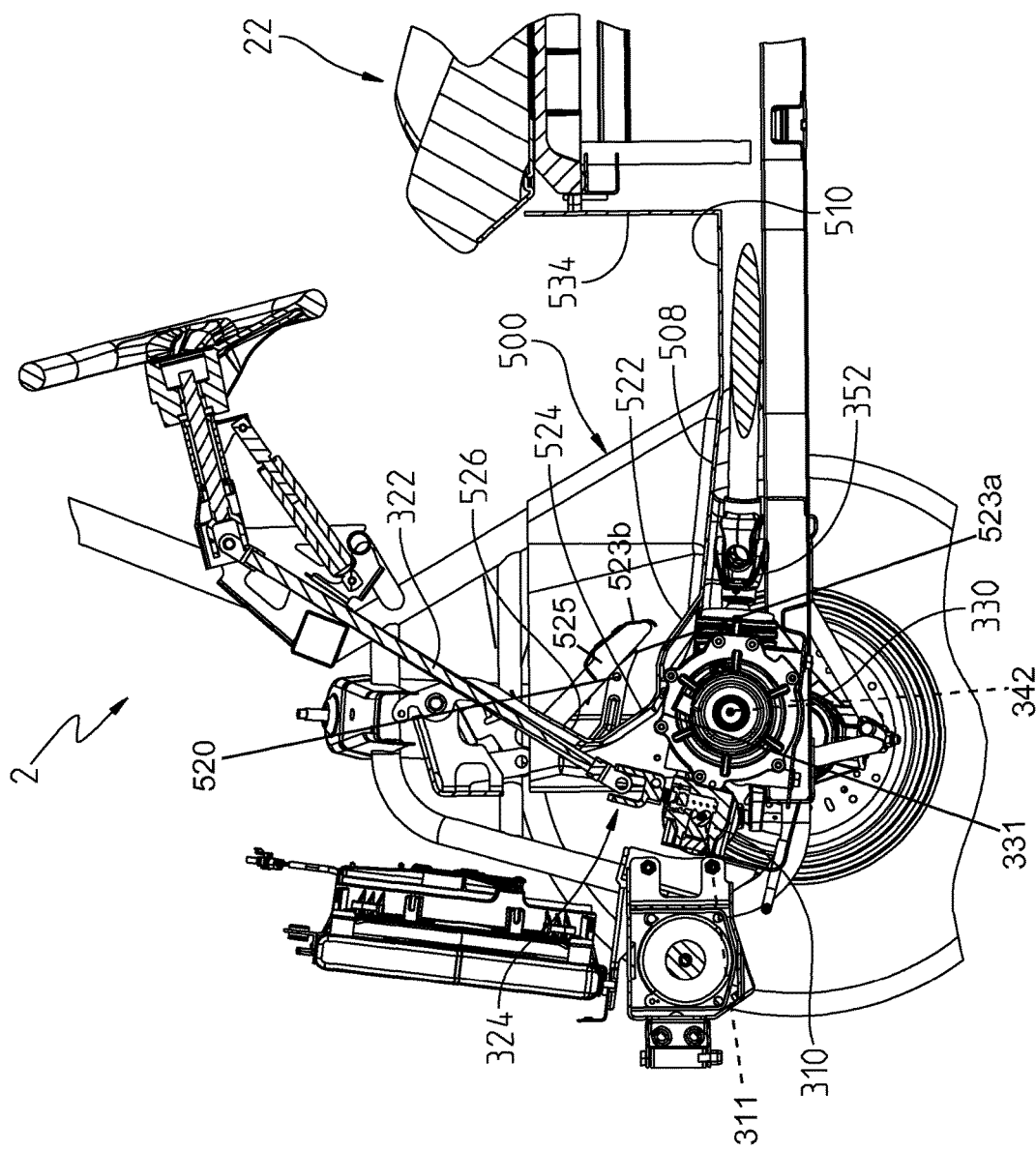
FIG. 26 is a cross-sectional view through lines 26-26 if FIG. 24.

With reference now to FIG. 13-15, ATV 2 includes a front differential 330 which includes constant velocity couplings 332 as output from differential 330 and further includes constant velocity couplings 336 (FIG. 13) as input to steering portions 294, thereby driving hubs 298. As shown best in FIG. 13, front differential 330 is mounted to a top of plate 212 by way of a plurality of fasteners 340. As shown in FIGS. 14 and 15, steering mechanism 310 and front differential 330 are positioned in a somewhat tandem relationship and as best shown in FIG. 14, the centerline of differential 330 (shown at 342 in FIG. 14) is positioned rearward of a centerline through constant velocity couplings 336 (shown at 342 in FIG. 14), therefore stub shafts 338 angle forward to the constant velocity couplings 336. Differential 330 also includes an input shaft at 350 and a universal joint at 352. As shown in FIG. 26, transverse actuation axis 311 of steering mechanism 310 is positioned below an upper surface 331 of differential 330.

Figure 18:
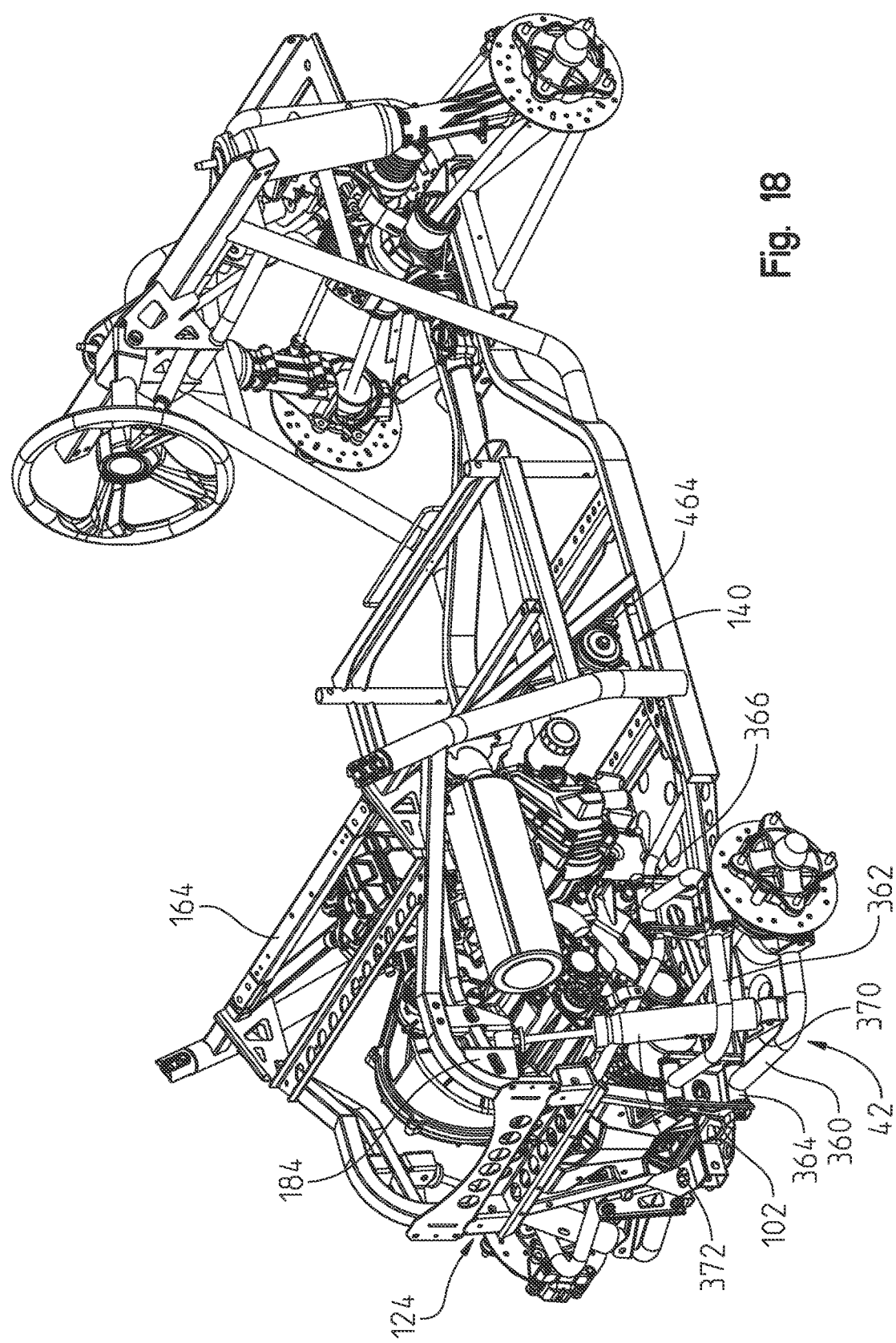
FIG. 18 is a right rear perspective view of the ATV.
Figure 19:
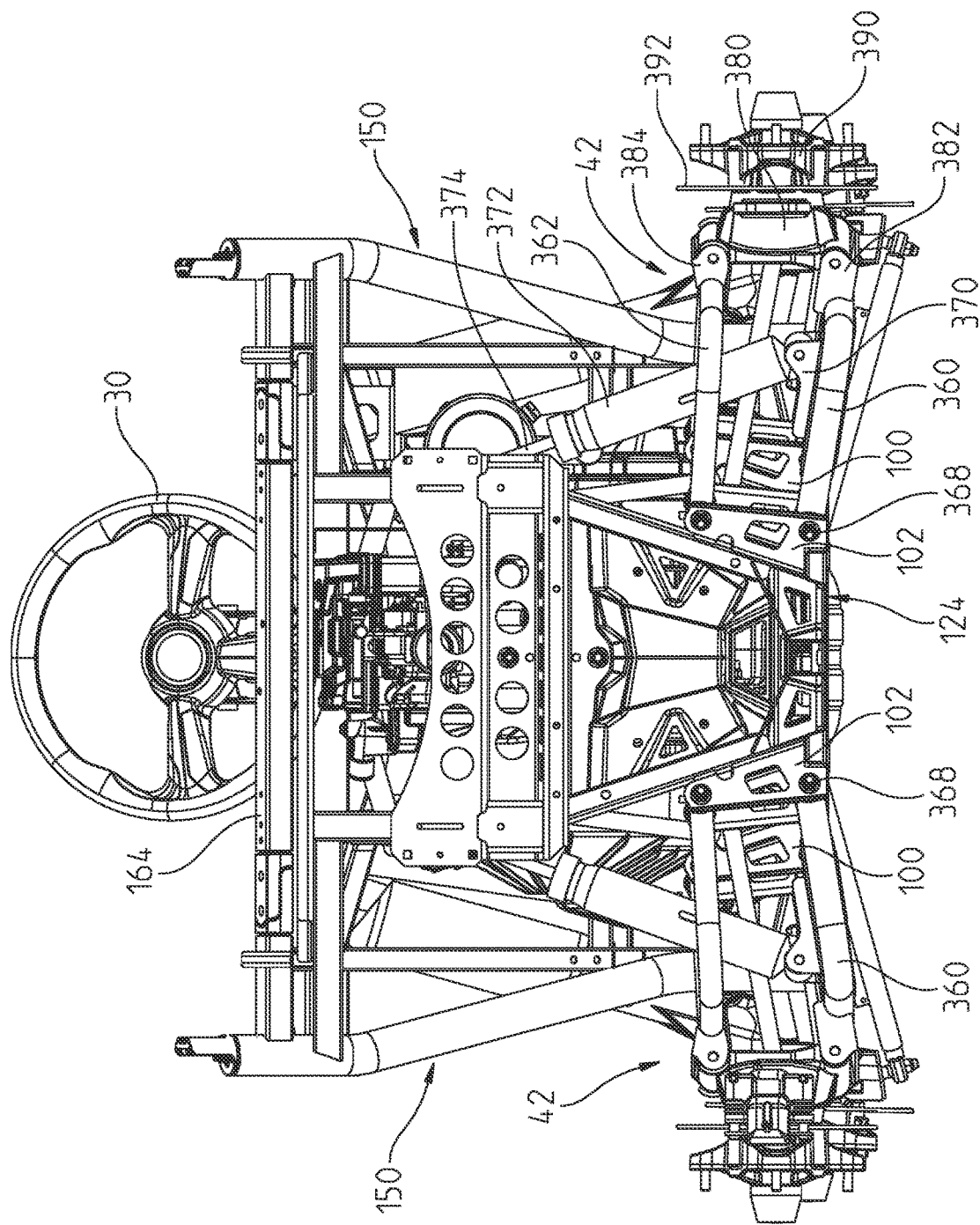
FIG. 19 is a rear view of the ATV shown in FIG. 18.
Figure 20:
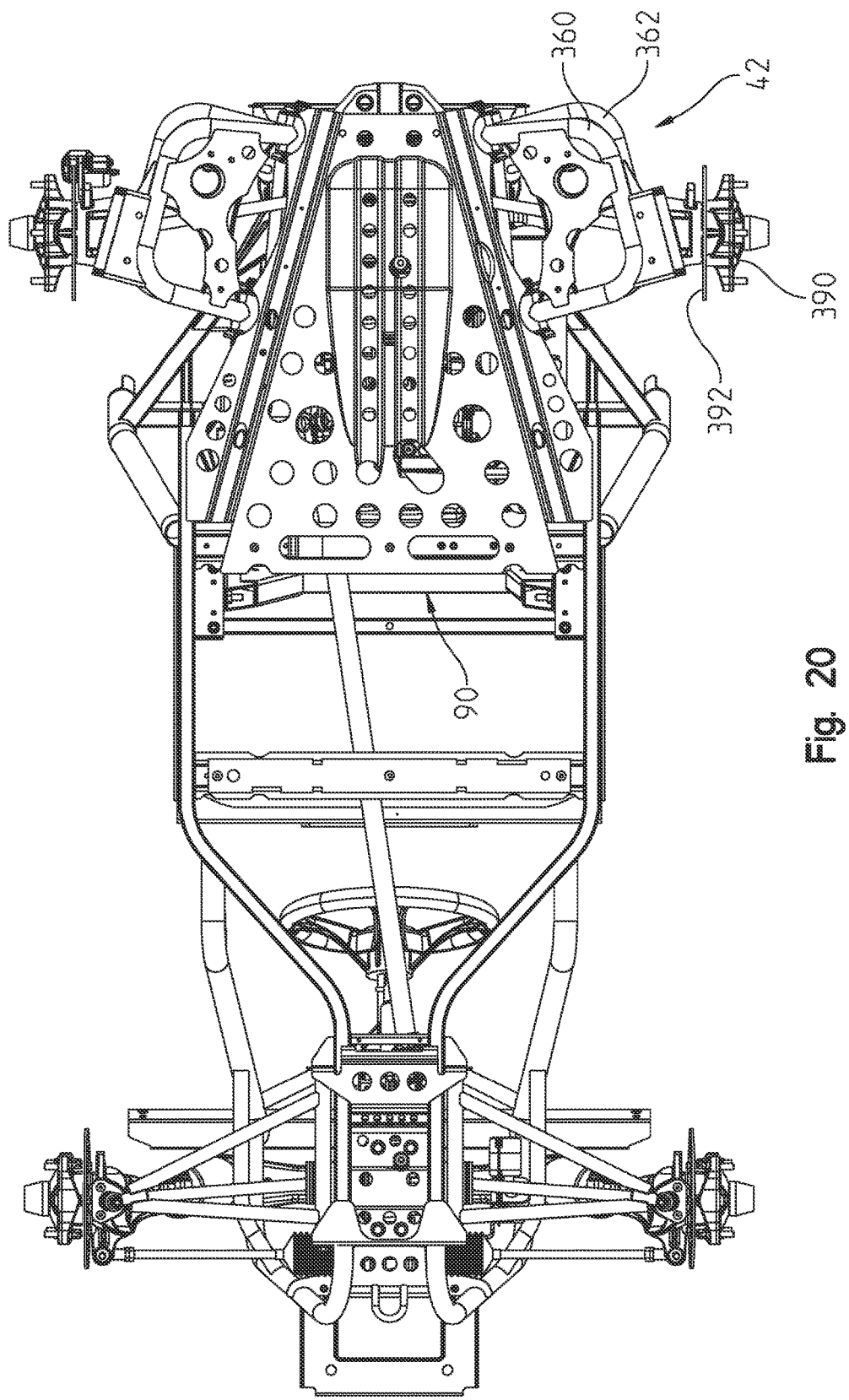
FIG. 20 is a bottom view of the vehicle shown in FIG. 18.

With reference now to FIGS. 18-20, rear suspension 42 will be described in greater detail. As shown, rear suspension 42 is comprised of lower control arm 360 and upper control arm 362 coupled to brackets 100, 102. Lower control arm 360 has inner couplings at 364 and upper control arm 362 has couplings at 366. These couplings are positioned within channels 100, 102 and pivotally attached by way of fasteners 368 as best shown in FIG. 19. Lower control arm 360 includes a bracket 370 for mounting a shock absorber 372 with the shock rod 374 (FIG. 19) coupled to bracket 184 (FIG. 18). As shown best in FIG. 19, rear suspension 42 further comprises spindles 380 coupled to coupling 382 of lower control arm 360 and upper coupling 384 of upper control arm 362. A hub 390 is rotatably coupled to spindle 380 and includes a brake disk 392.

Figure 21:
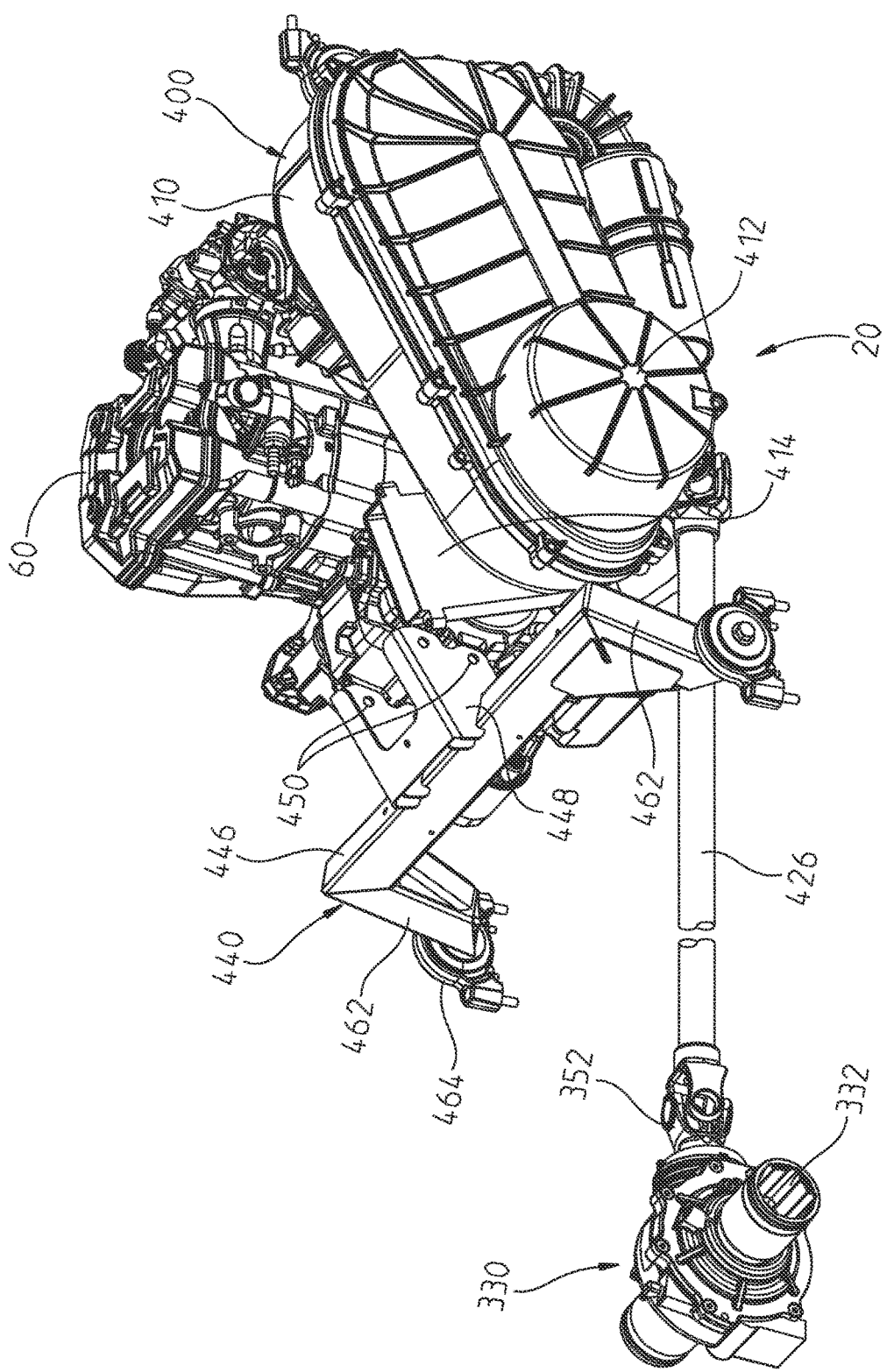
FIG. 21 shows a top perspective view of the power train and differentials.
Figure 22:
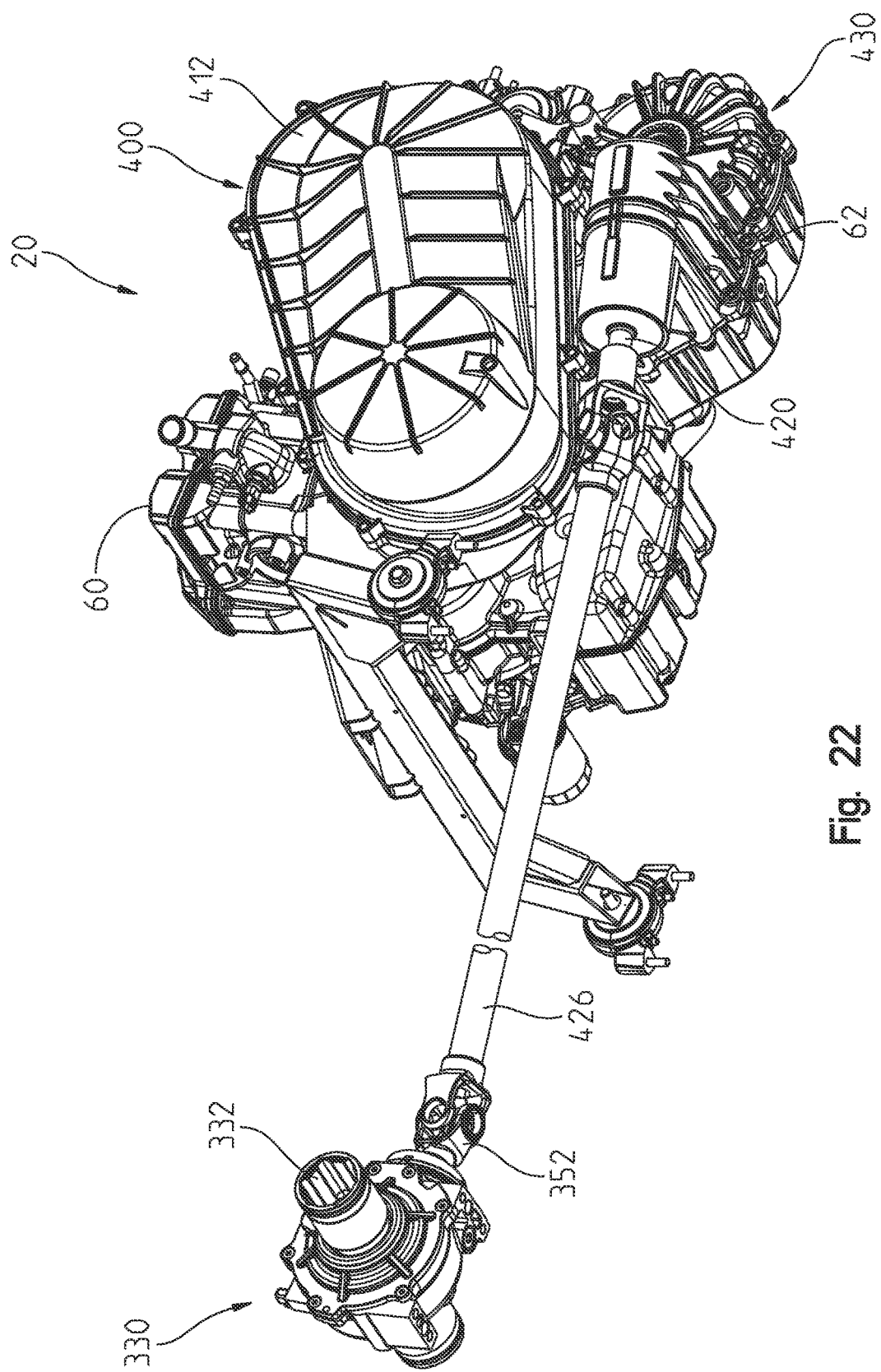
FIG. 22 is an underside perspective view of the power train and differentials shown in FIG. 21.
Figure 23:
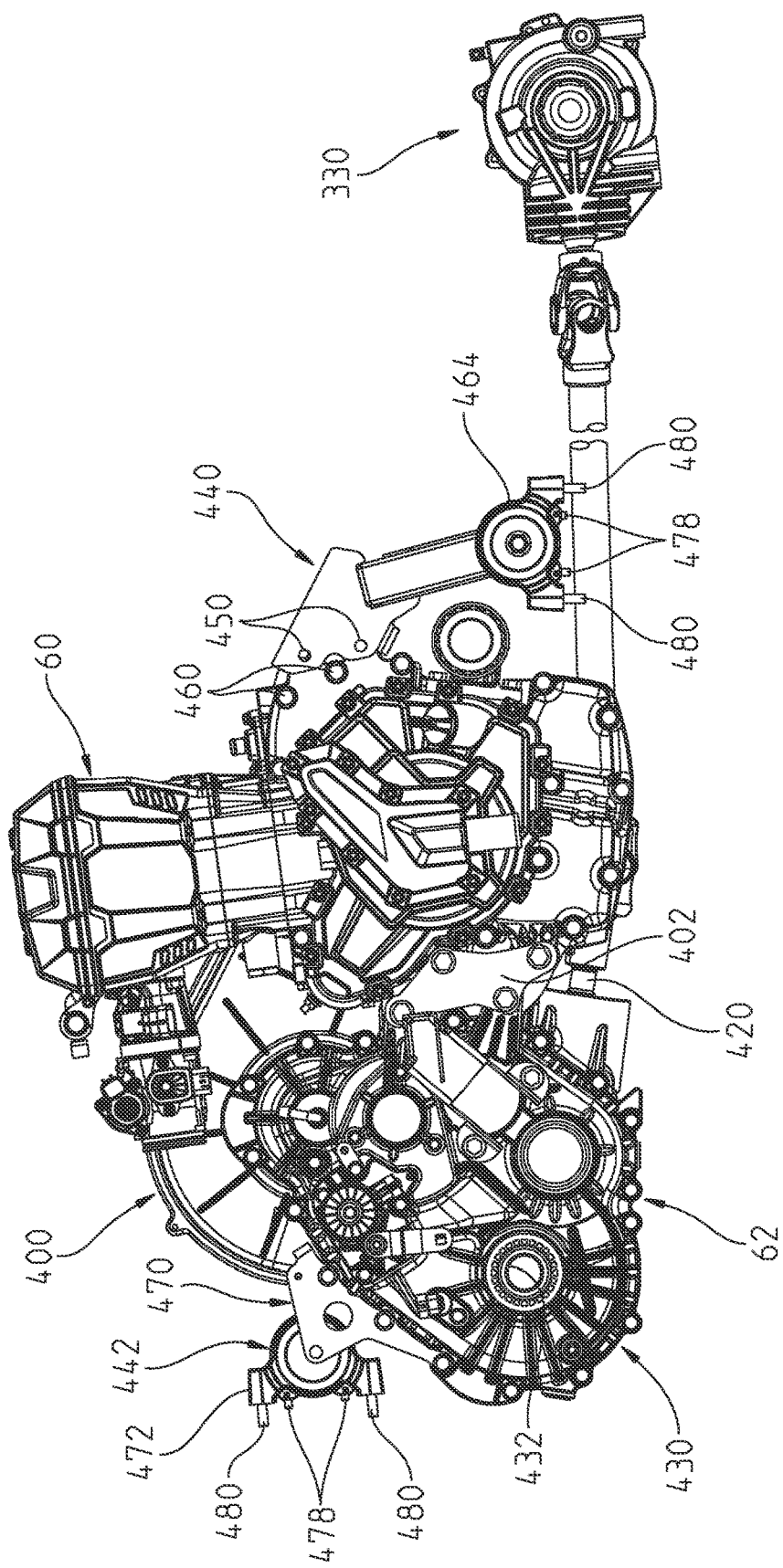
FIG. 23 is a right side view of the power train and differentials of the ATV.

With reference now to FIGS. 20-22, power train 20 is shown in greater detail. Power train 20 includes engine 60 and transmission 62 coupled to each other as shown in either of U.S. patent application Ser. No. 12/849,480 or 12/849,516, both of which were filed on Aug. 3, 2010, the subject matter of which is incorporated herein by reference. Engine 60 couples to transmission by way of a continuously variable transmission (CVT) 400 and engine 60 and transmission 62 are mechanically connected to each other by way of links 402 (FIG. 23). CVT 400 includes an inner housing 410 and an outer housing 412 which houses a drive and driven clutch as is known in the art. Inner cover 410 includes cooling air inlet duct at 414 which may be connected to an intake duct as described in either of U.S. patent application Ser. Nos. 12/849,480 or 12/849,516, both of which were filed on Aug. 3, 2010, the subject matter of which is incorporated herein by reference.

As shown, transmission 62 includes an output 420 (FIG. 22) facing forwardly and positioned under CVT 400, which drives front differential 330 through drive shaft 426. As shown in FIG. 23, transmission 62 is integrated with rear differential 430 having splined output drive couplings 432. Thus as shown, engine 60 and transmission 62 are both drivingly coupled to each other through CVT 400 as well as rigidly connected together by way of links 402. The engine and transmission can therefore be mounted as a subassembly and mounted within frame 10 of ATV 2. Engine and transmission subassembly are mounted via a three point mounting system through front engine mount 440 and rear engine mount 442, as described below.

Front engine mount 440 is shown best in FIG. 21 having a cross beam 446 attached to bracket 448 having mounting apertures at 450. Engine mount 440 is shown somewhat exploded away from engine 60 in FIG. 21, and it should be appreciated that front engine mount 440 is attached to the block of engine 60 by removing fasteners 460 (FIG. 23) and inserting fasteners 460 through mounting apertures 450. Front engine mount 440 further includes mount arms 462 which includes resilient engine mounts 464. With reference to FIG. 23, rear mount 442 includes a bracket 470 fixed to the transmission 62 which retains a resilient engine mount 472 which is substantially the same as those shown at 464 (FIG. 21). Each of the mounts 464, 472 includes locating pegs 478 and fasteners 480 for coupling the engine mounts to the frame.

With reference again to FIGS. 18 and 19, engine and transmission subassembly is shown supported by the frame with engine mounts 464 attached to front engine mounts 140. In this configuration, locating pegs 478 of mounts 464 are located in locating apertures 148 (FIG. 10) while fasteners 480 are positioned through apertures 146. Meanwhile, locating pegs 478 of mount 442 are located in locating apertures 146 (FIG. 9) while fasteners 480 are positioned through apertures 134 (FIG. 9).

Figure 24:
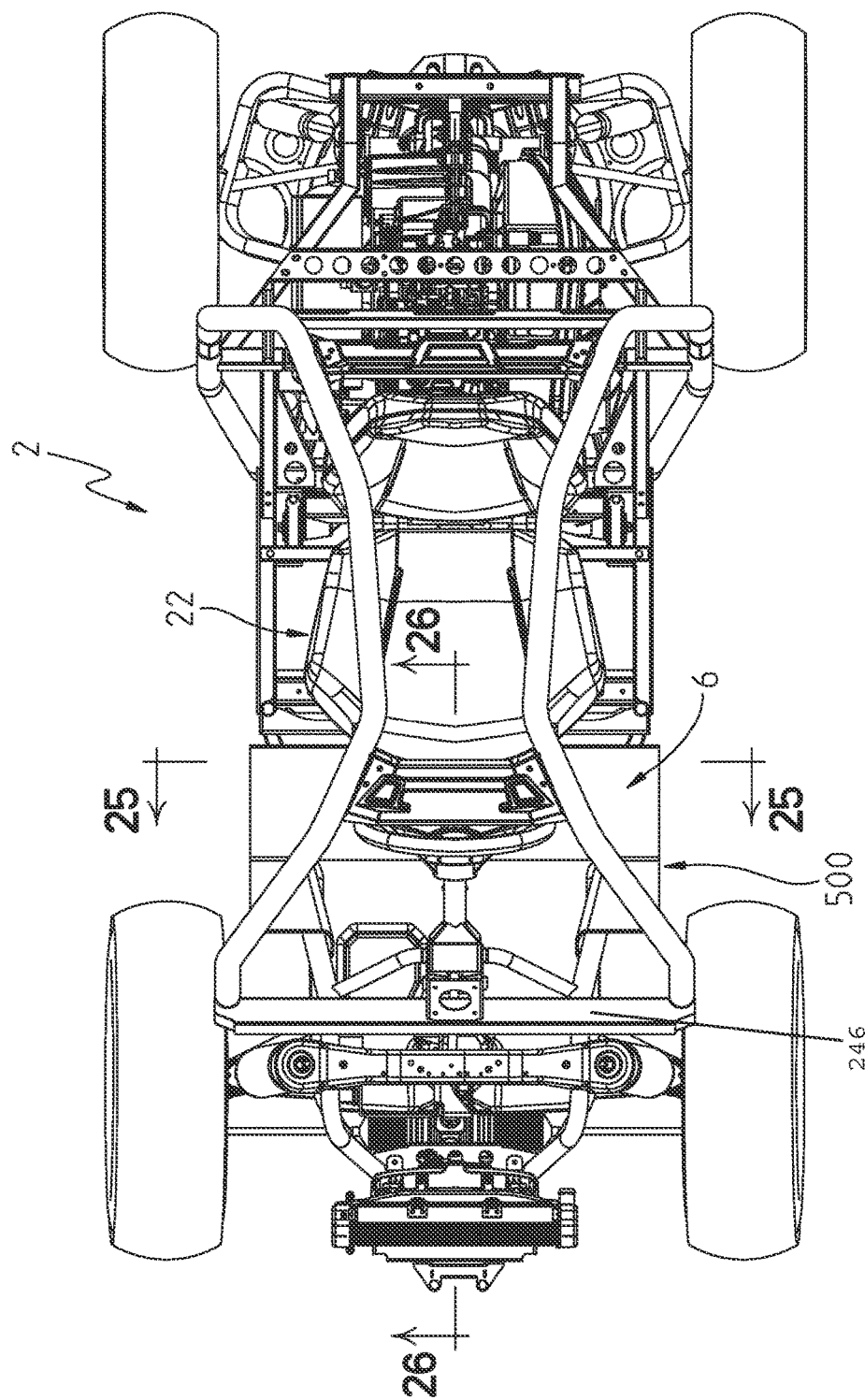
FIG. 24 is a top plan view of the ATV showing the operator's compartment.
Figure 25:
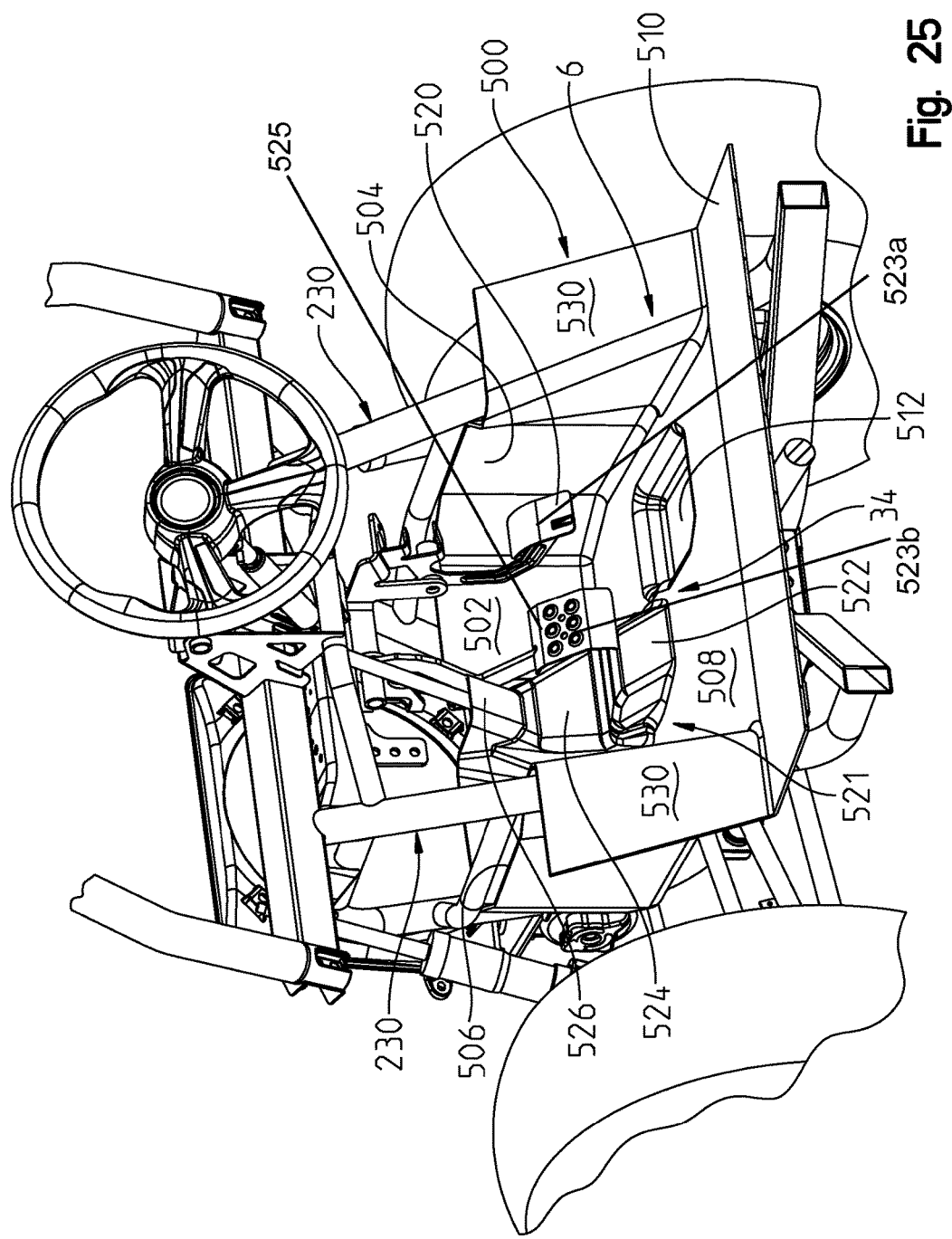
FIG. 25 is a cross-sectional view through lines 25-25 of FIG. 24.

With reference now to FIGS. 24-26, the operator's compartment 6 will be described in greater detail. As shown, ATV 2 includes a front enclosure member 500 which includes a back wall 502, side walls 504 and 506, an inclined floor portion 508 and floor board portion 510. A recess portion 512 is provided for the operator's foot, such that the operator's heel can be positioned in the recess 512 and operate the accelerator pedal 520 of the operator controls 34. The recess 512 could be similarly designed to that shown in U.S. patent application Ser. No. 12/218,572 filed Jul. 16, 2008, the subject matter of which is incorporated herein by reference. Additionally, accelerator pedal 520 and a brake pedal 525 each include a contact surface 523*a* and 523*b*, respectively, configured to receive the operator's foot for operating ATV 2 (FIG. 25). As shown in FIG. 26, contact surfaces 523*a* and 523*b* of accelerator pedal 520 and brake pedal 525, respectively, are positioned rearward of transverse actuation axis 311 of steering mechanism 310 and rearward of centerline 342 through couplings 336.

Front enclosure 500 further includes a center section 521 including a first convex section 522, a protruding section 524 and a recessed portion 526. Front enclosure 500 further includes lateral sections 530 (FIG. 25) which extend outwardly from the operator's area and overlap frame tubes 230. As shown best in FIG. 26, the front enclosure 500 further includes a wall portion 534 extending upwardly from floor board portion 510 extending substantially up to seat 22. With reference still to FIG. 26, ATV 2 is shown in section which shows concave portion 522 extending over and providing clearance for differential 330; protrusion 524 providing clearance for universal joint 324; and recessed portion 526 providing clearance for steering rod 322.

It should also be appreciated that the operator's compartment, particularly the feet room defined between side walls 504 and 506 is extremely voluminous, even with the reduced wheel base of ATV 2. This is accomplished by providing the front steering mechanism 310 and front differential 330 in tandem relation relative to each other and by providing the front suspension as a strut mechanism as opposed to a double control arm mechanism. Said differently, if an upper control arm had been used in addition to the front lower control arm 280, then an inner coupling position of an upper control arm would have reduced the allowable space for front enclosure 500. For example and with reference again to FIG. 14, if an upper control arm had been used, it would have been mounted generally vertically above lower control arms and would have been mounted above front differential 330. Rather, the use of a single lower control arm 280 and the use of struts allow side walls 504 and 506 to be at least as wide as front frame tubes 230.

Figure 27:
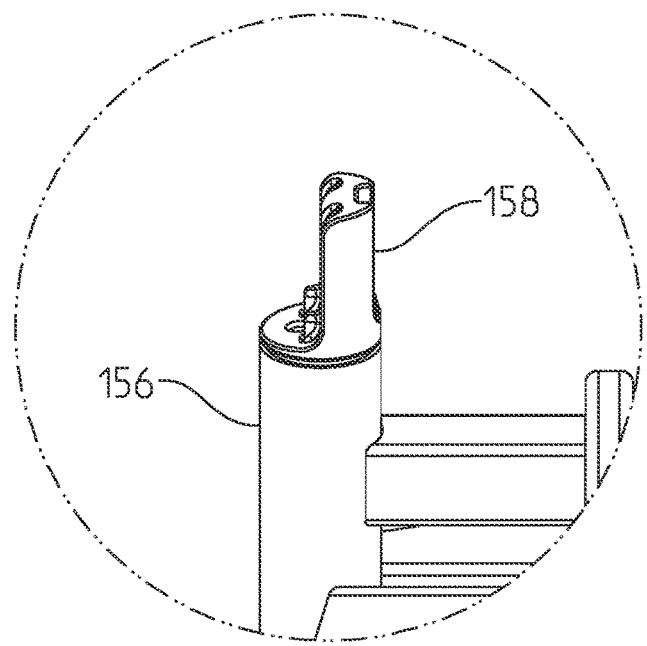
FIG. 27 is an enlarged view of the portion denoted in FIG. 9.
Figure 28:
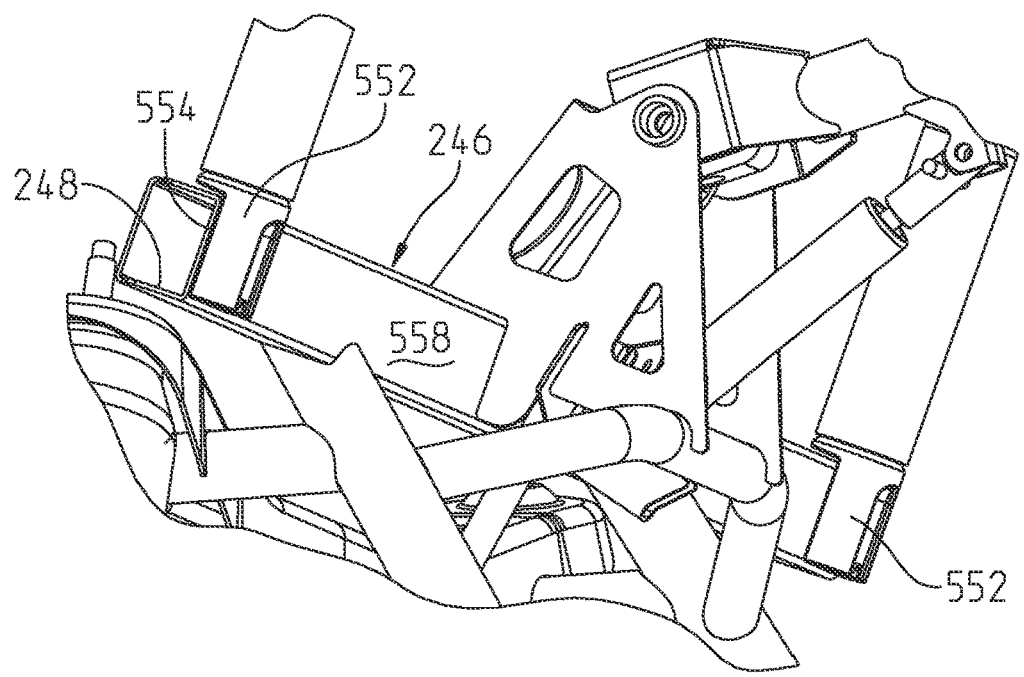
FIG. 28 is an enlarged perspective view of the ATV roll cage front connection.
Figure 29:
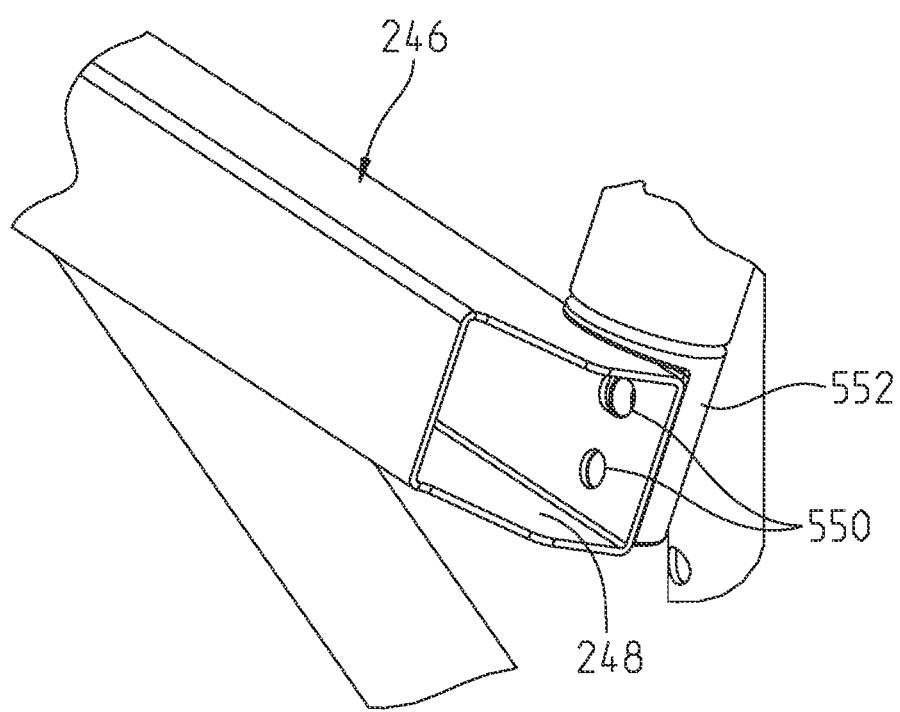
FIG. 29 is an enlarged perspective view of the front of the ATV roll cage connection of FIG. 28.

With reference now to FIGS. 27-29, frame 10 is provided with a coupling assembly to couple roll cage 4. As shown in FIG. 27, couplers 158 are fixed within an open end of frame tube portion 156 and are provided in a semi-cylindrical configuration. As shown in FIGS. 28 and 29, front frame tube 246 includes cut out portions 248 at each end which provides access to mounting apertures 550 (FIG. 29). More specifically, front frame tube 246 includes a front tube wall and a rear tube wall, and a portion of the front tube wall adjacent each end is cut away to expose the rear tube wall. Couplers 552 are provided having a semi-cylindrical portion having a flat face 554 which can abut back surface 558 of frame tube 246, and then fasteners are received through apertures 550 retaining couplers 552 thereto. As described, four couplers, that is couplers 158 and 552 are provided such that roll cage 4 can be assembled and disassembled from ATV 2, as further described herein. With reference again to FIG. 4, as described above roll cage 4 defines an enlarged enclosure for an operator. As shown in FIG. 4, due to the outward configuration of frame tubes 150, the enclosure extends beyond lines 560 which project from inner surfaces of the front tires. More particularly, a width shown at 562 of the roll cage 4 is 36.028 inches in width (915.115 mm).

Figure 30:
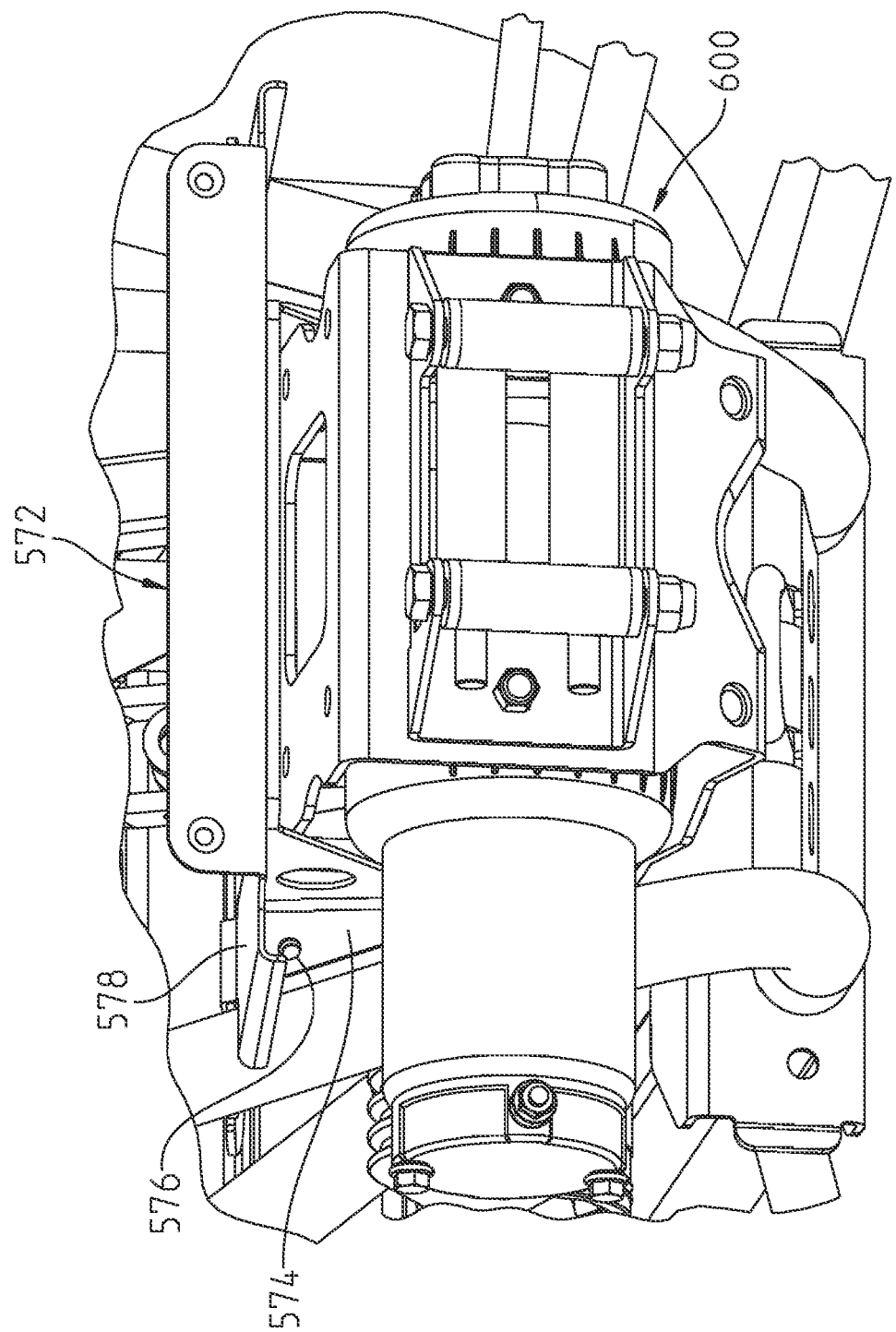
FIG. 30 shows a front perspective view of a winch mounted to the ATV.
Figure 31:
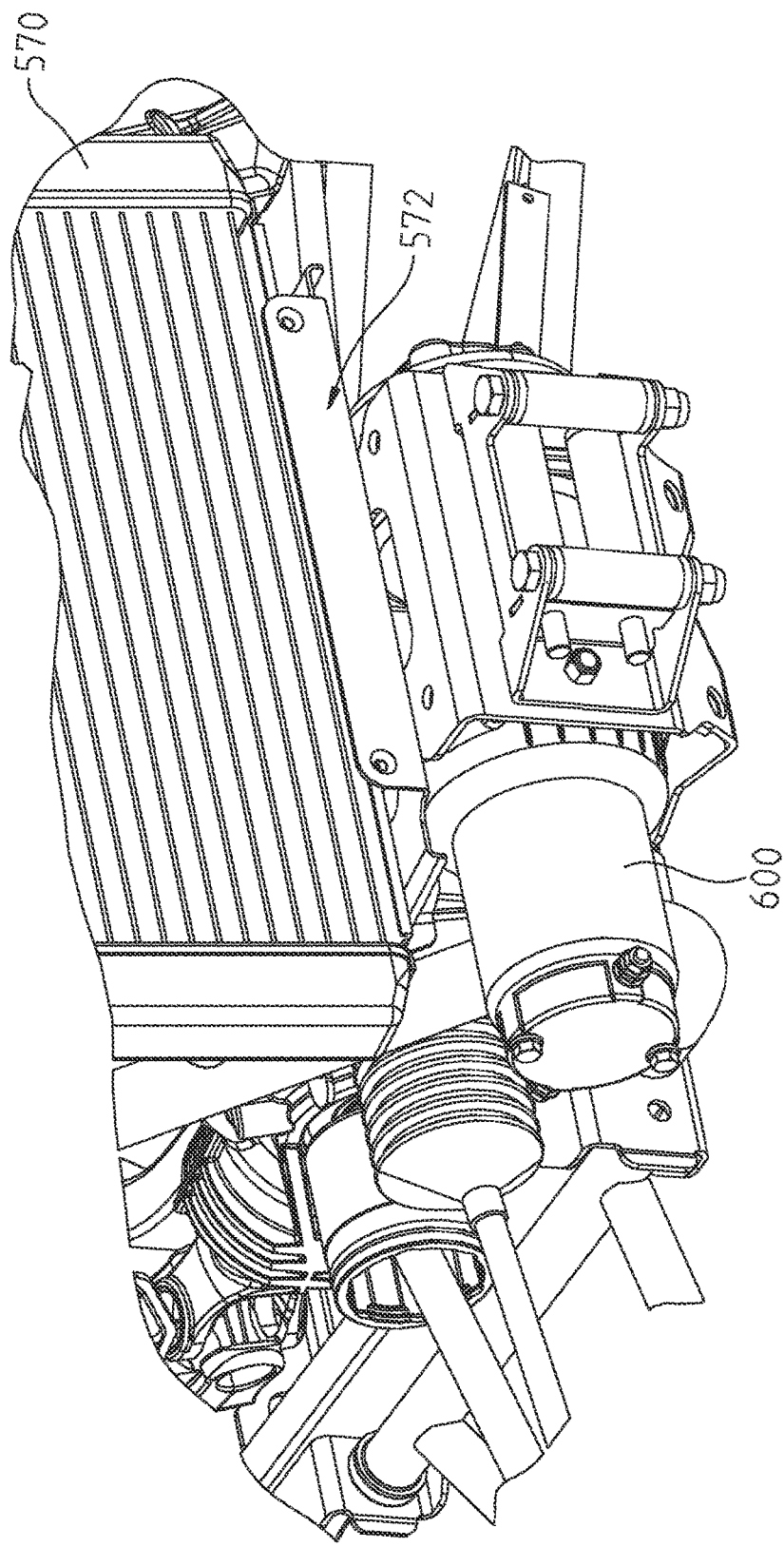
FIG. 31 shows the radiator mounted above the winch.
Figure 32:
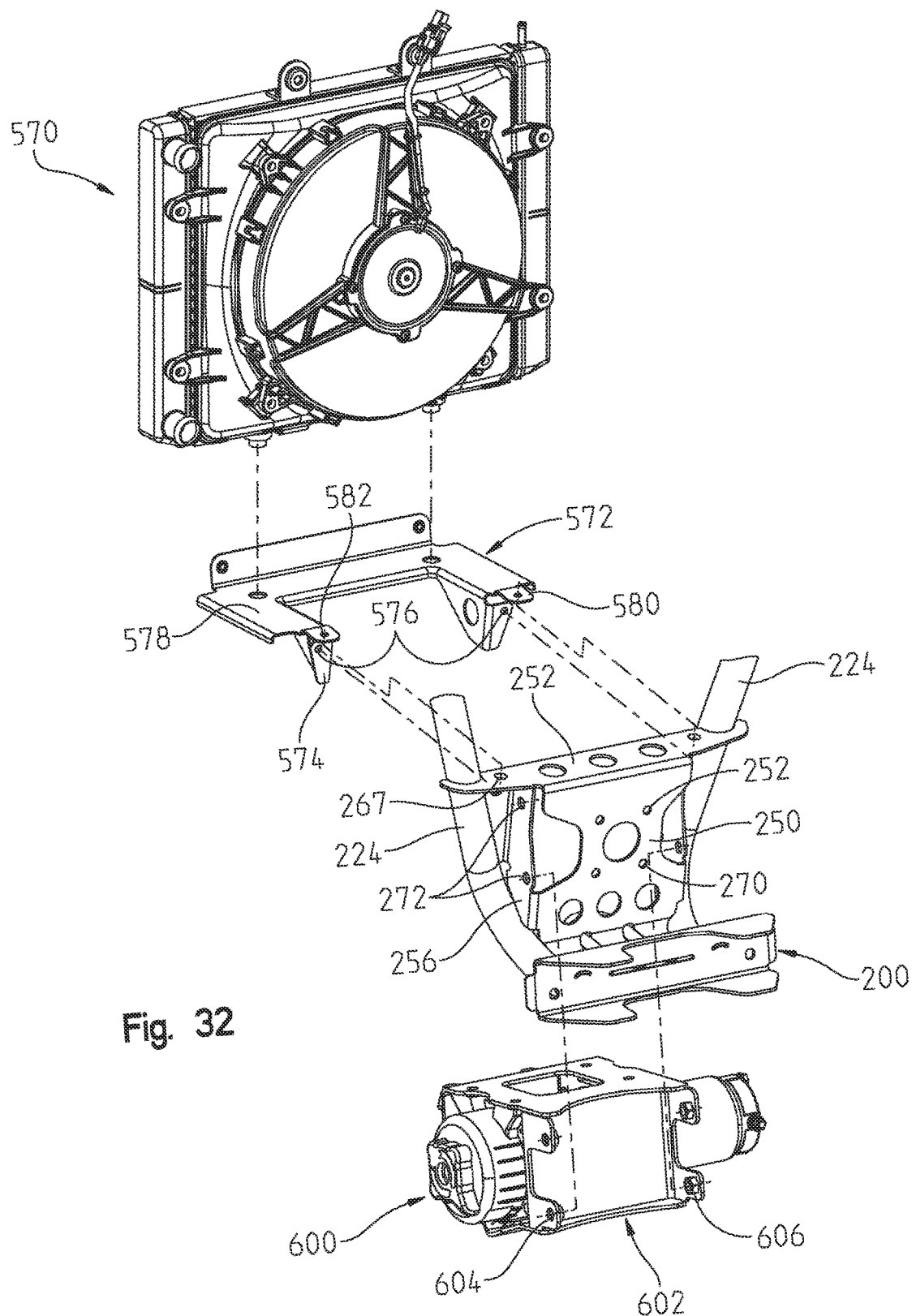
FIG. 32 shows an exploded view of the mounting of the winch and radiator.

With reference now to FIGS. 30-32, radiator 570 is shown supported by radiator bracket 572. Radiator bracket 572 is attached to front bracket 72 by way of fasteners through apertures 576 of tabs 574 into threaded apertures 266 (FIG. 12). Radiator bracket 572 also includes upper tabs 580 having apertures 582 therethrough. Tabs 580 overlap top wall 252 of bracket 72 and a fastener may be positioned through apertures 582 into threaded apertures 267. This provides an upper platform surface 578 for supporting radiator 570.

As also shown in FIG. 32, winch 600 is provided having a mounting bracket 602 having apertures 604 with threaded members 606 attached thereto. Bracket 602 may be positioned within side walls 254, 256 with apertures 604 aligned with apertures 272 where upon a fastener may be positioned through apertures 272 to engage thread members 606.

Figure 33:
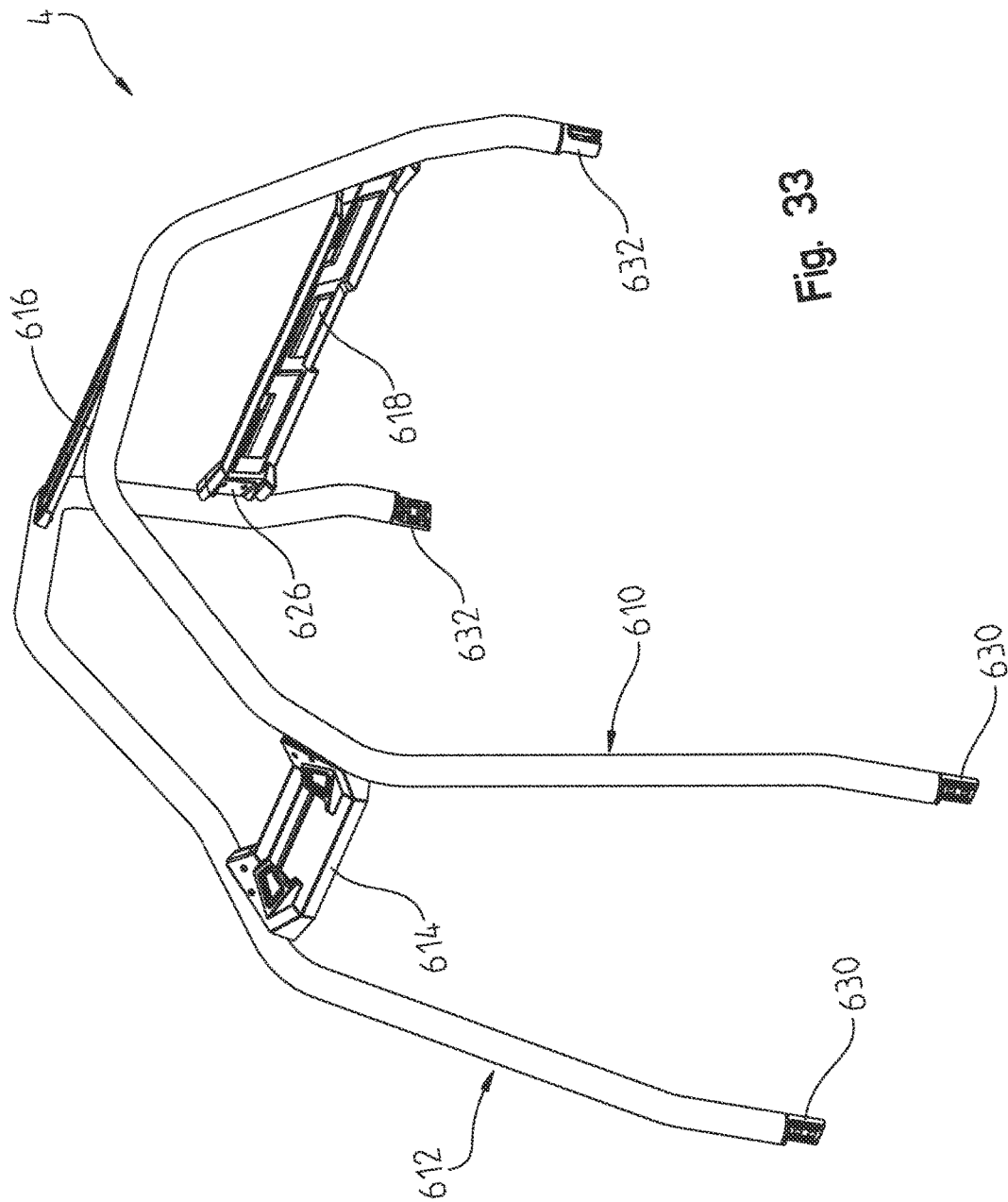
FIG. 33 shows a perspective view of the roll cage.
Figure 34:
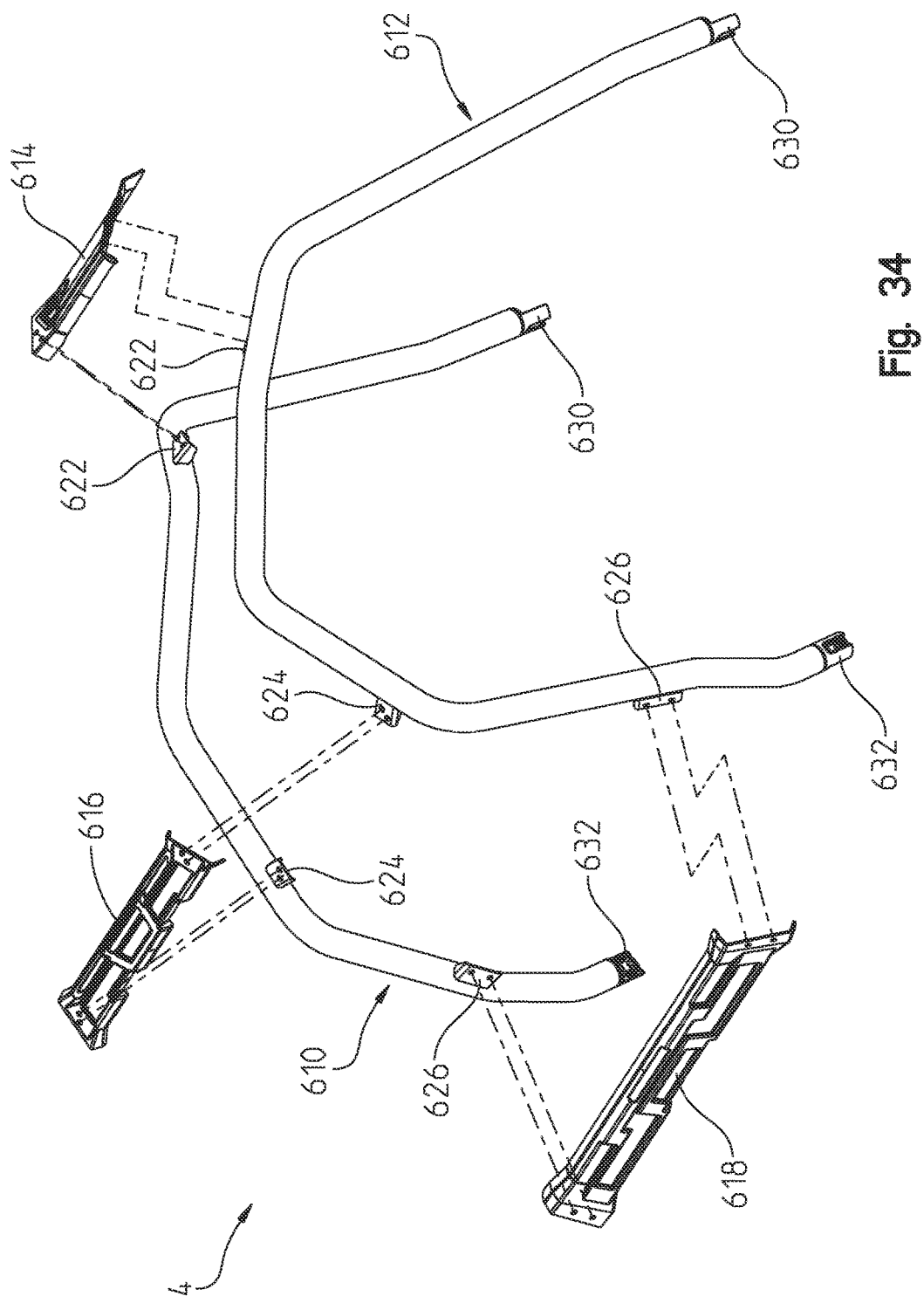
FIG. 34 shows a rear exploded view of the roll cage of FIG. 33.

With reference now to FIGS. 33 and 34, roll cage 4 is shown in greater detail. As shown, roll cage 4 includes left frame member 610 and right frame member 612, the frame members 610 and 612 being fastened together by way of cross braces 614, 616 and 618. In the embodiment shown, cross braces 614, 616 and 618 are structural members formed of a rigid material and as shown are stamped and formed steel members. Brackets 622, 624 and 626 (FIG. 34) are coupled to the frame members 610 and 612, and cross brace 614 is attached to the brackets 622; cross brace 616 is attached to the brackets 624; and cross brace 618 is attached to the brackets 626. In addition, front couplers 630 are provided, which correspond with couplers 552 (see FIG. 29), and the couplers 552, 630 are attached to each other by way of fasteners. Rear couplers 632 are also provided, which correspond with couplers 158 (see FIG. 5), and the couplers 158, 632 are attached to each other by way of fasteners. In the embodiment shown, brackets 622, 624 and 626 are structural members formed of steel or of a casting and are welded to the left and right frame members 610 and 612. Cross braces 614, 616 and 618 may then be attached to the brackets by way of fasteners. As should be appreciated, the entire roll rage 4 can be added or removed by way of the fasteners through the couplers 630, 632.

Figure 35:
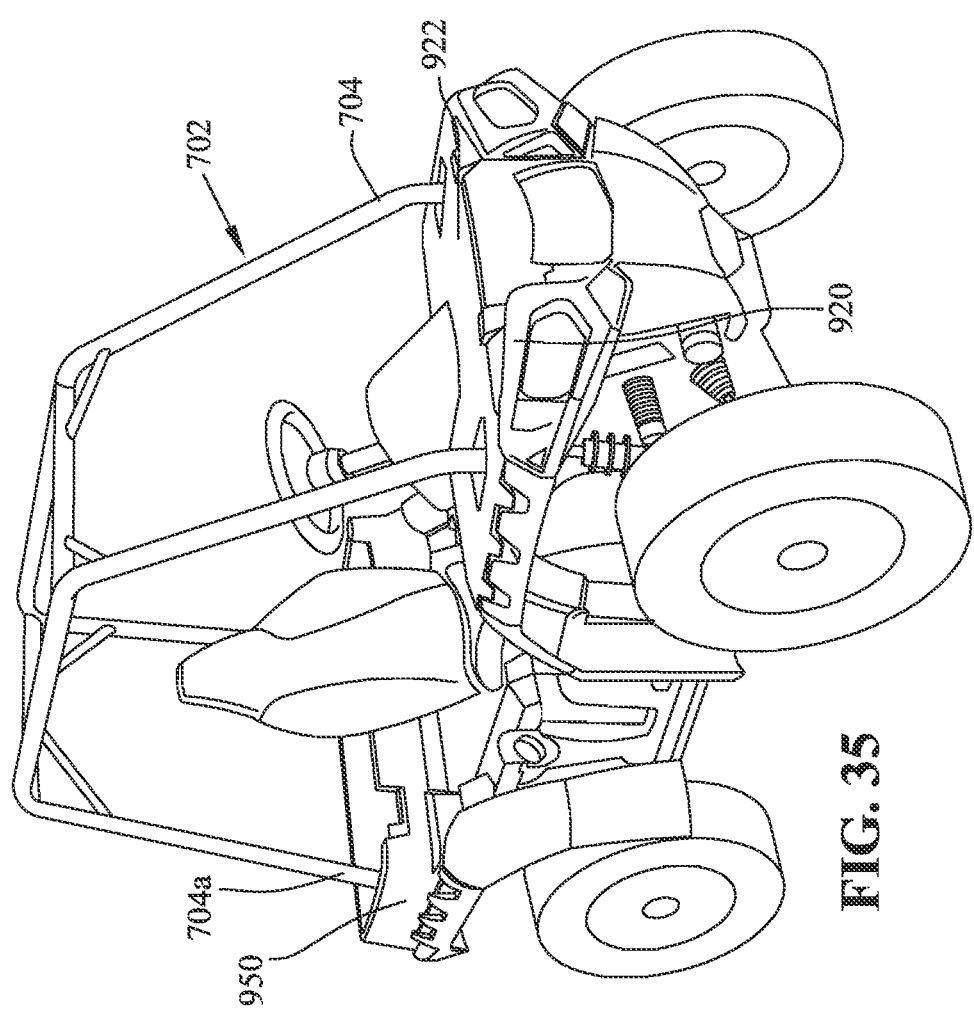
FIG. 35 is a front right perspective view of a vehicle of a second embodiment of the present application.
Figure 36:
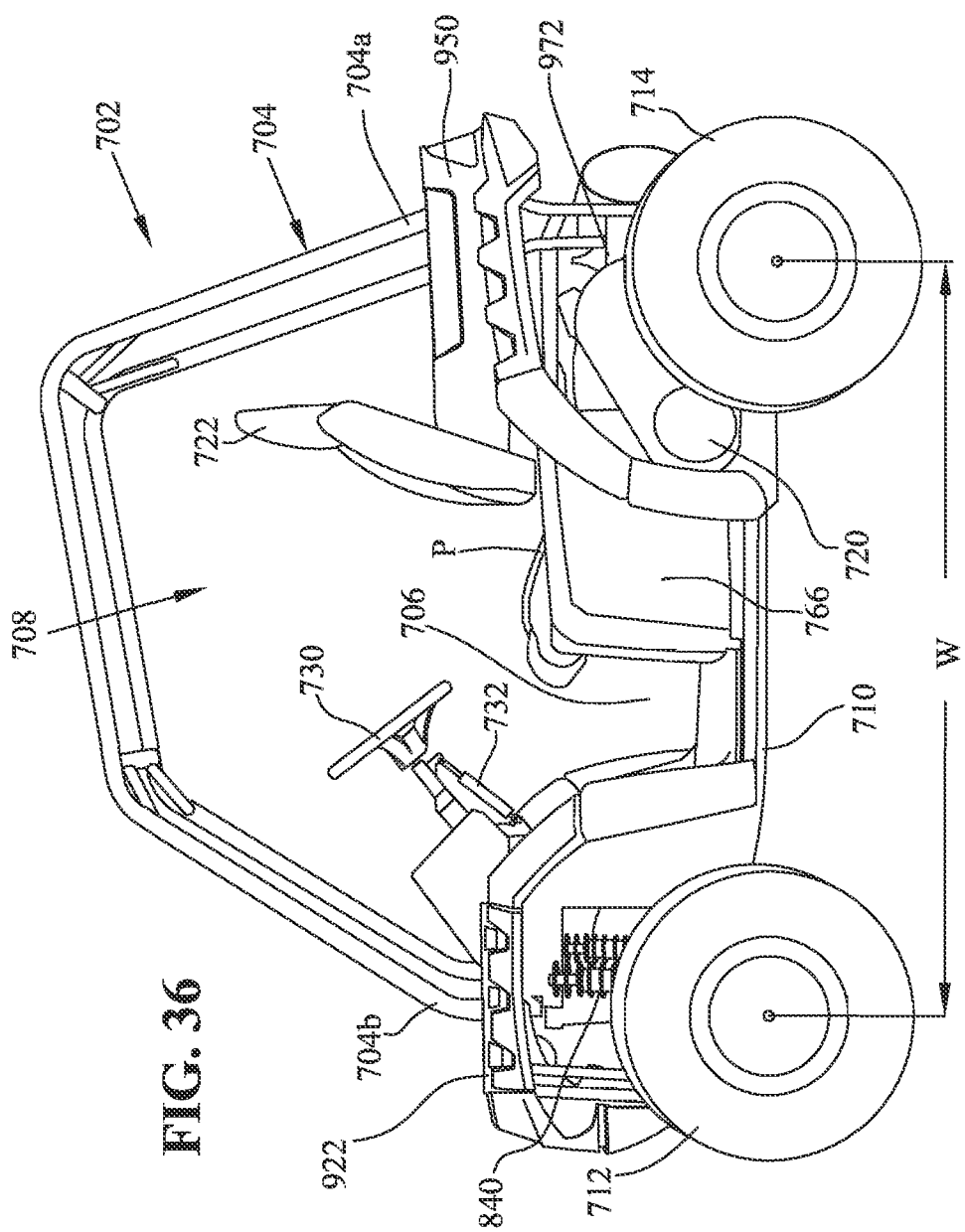
FIG. 36 is a left-hand side view of the vehicle of FIG. 35.

With reference now to FIGS. 35-46, a second embodiment will be shown. With reference first to FIGS. 35-36, the general nature of the vehicle will be described. As shown, vehicle 702 is an ATV class vehicle for a single rider having dimensions similar to those of the Polaris Sportsman XP vehicle. However as vehicle 702 includes a roll cage structure 704, the vehicle includes a walk through opening at 706 entering into operator's compartment 708, as best shown in FIG. 36. With that background, the vehicle will be described in greater detail.

As shown in FIG. 36, vehicle 702 includes a frame 710, supported by front wheels 712 and rear wheels 714. Frame 710 generally supports a powertrain 720 as well as a single seat 722 shown in the form of a bucket seat. The bucket seat 722 may take the form of the seat in the vehicle known as the Polaris RZR, which is also shown in U.S. Pat. No. 7,819,220 (EP Patent 2046625 B1), the subject matter of which is incorporated herein by reference.

Figure 38:
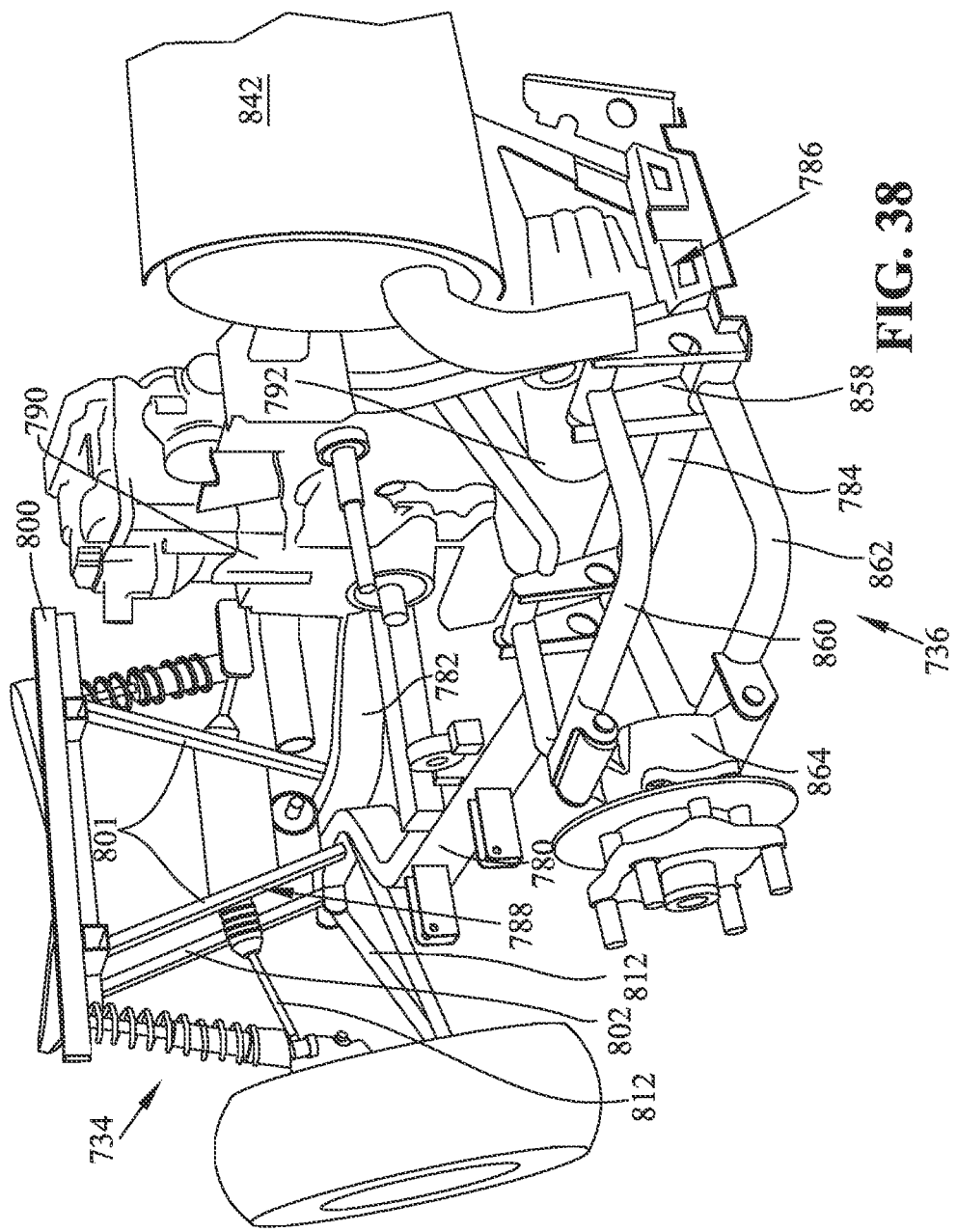
FIG. 38 is a left rear perspective view of the vehicle frame with the engine mounted.

As shown in FIG. 36, the vehicle may be steered by a steering wheel 730 which is adjustable by adjustable mechanism 732. Alternatively, vehicle 702 may be steered by a handlebar as is known by the Polaris Sportsman XP referred to above. In terms of vehicle speed controls, vehicle 702 may have an accelerator pedal and a brake pedal similar to that of the Polaris RZR vehicle, or the vehicle may have vehicle speed controls by way of a thumb throttle and hand brakes on the handlebar as known by the Polaris Sportsman XP. The vehicle 702 includes a front suspension 734 and a rear suspension 736, as best shown in FIG. 38.

Figure 37:
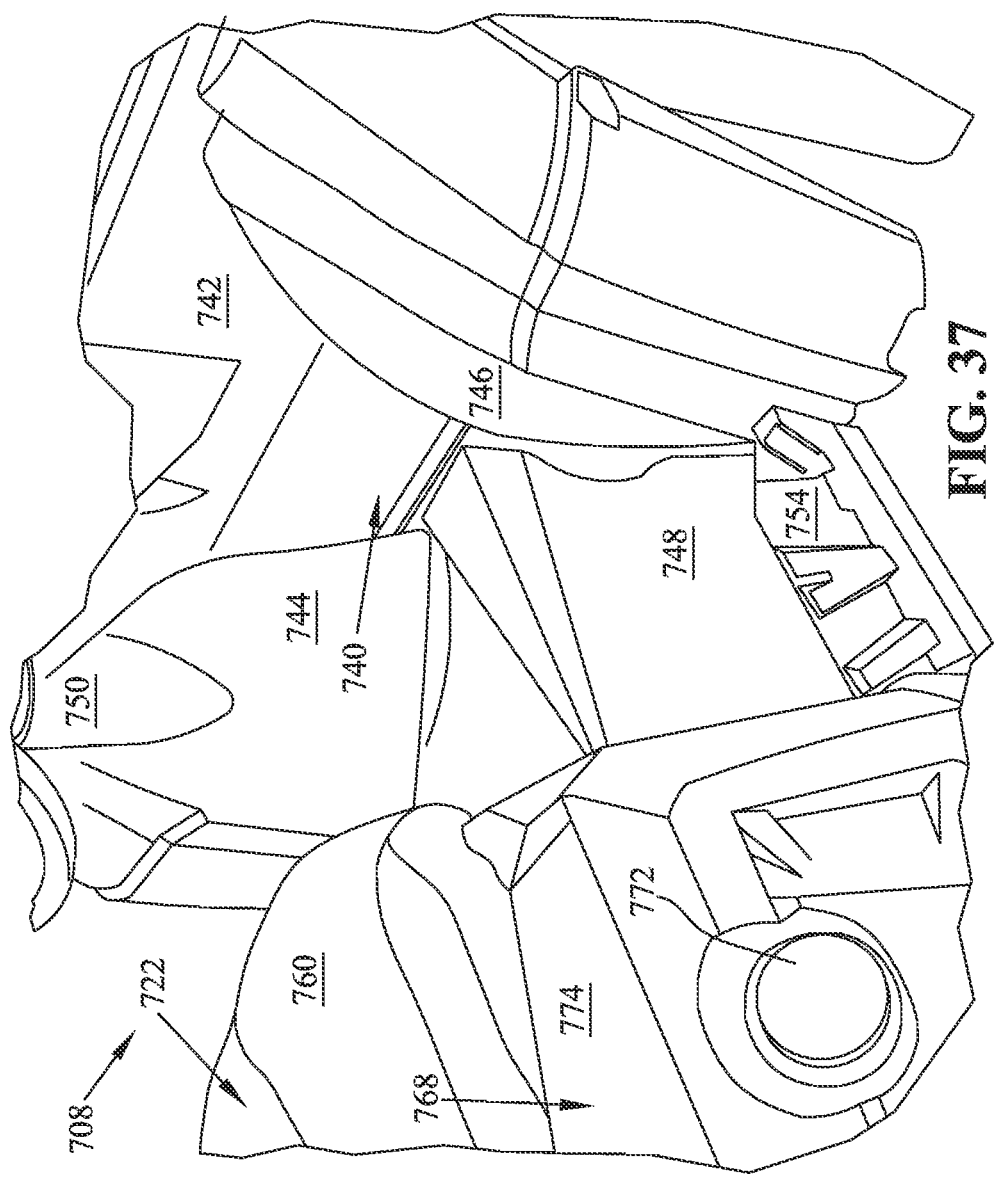
FIG. 37 is a right side perspective view of the operator's area.
Figure 39:
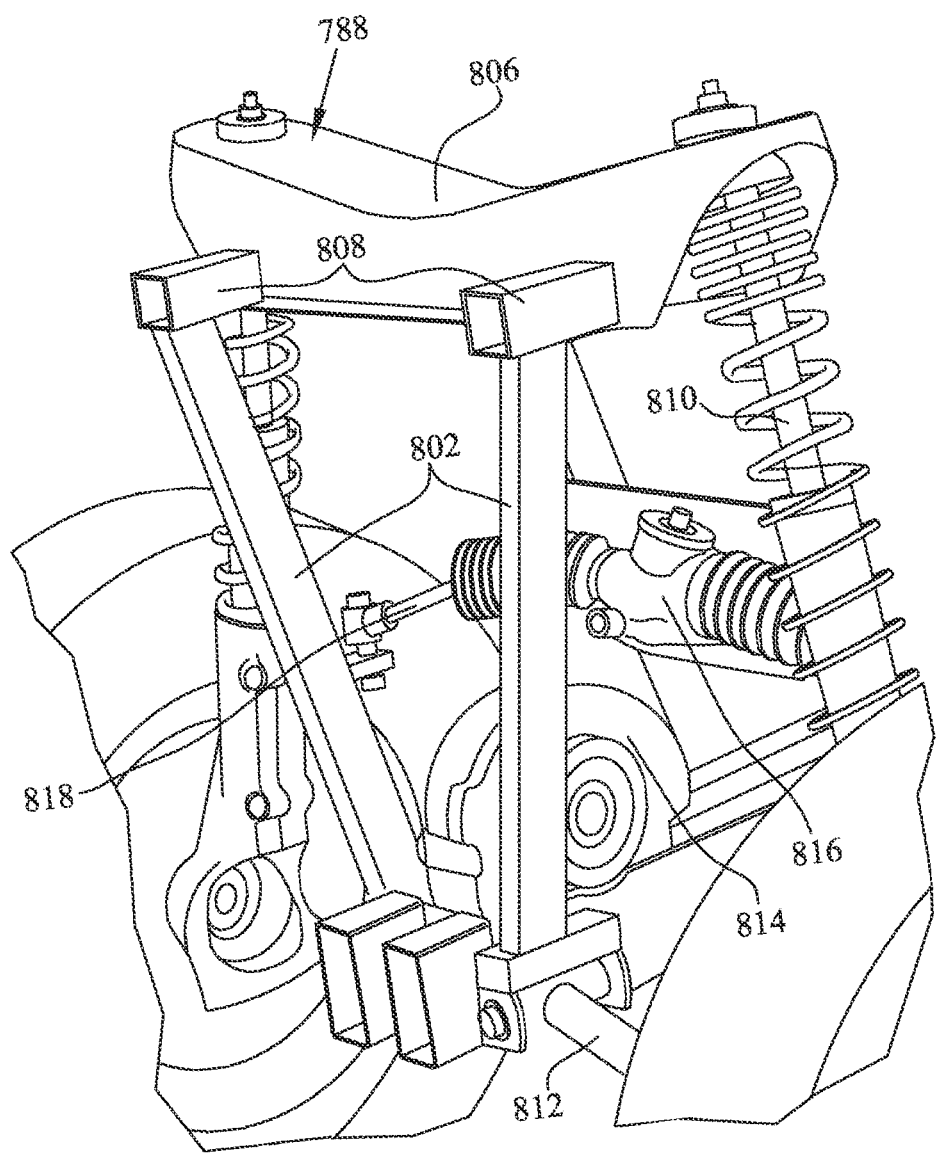
FIG. 39 is a front left perspective view of the front of the frame.

In either event, and with reference to FIG. 37, operator's area 708 includes a front enclosure 740 defined by back wall 742 and shrouded sidewalls 744 and 746. This allows the operator's feet to be fully forward and nested in front enclosure 740 preventing the operator's feet and legs from moving from side to side. As also shown in FIG. 37, floorboard 748 is substantially flat allowing the ingress and egress of the operator. As shown, shrouded portion 744 can include an integrated cup holder such as 750 providing an ergonomic position for a cup holder or water bottle for the driver. As also shown in FIGS. 38 and 39, entry treads 754 flank the operator walk through entry. While these are shown as flush with the floorboard 748, it should be appreciated that they could also be provided with a lip, to further define an enclosure. Side nets may also be provided to cover the opening across the operator's entry way, as shown and described in assignee's pending U.S. application Ser. No. 12/796,495 (and corresponding PCT application PCT/US2010/38709) the subject matter of which is incorporated herein by reference.

With reference again to FIGS. 36 and 37, single seat 722 is shown having a seat bottom 760 for supporting the driver. As shown, seat bottom 760 is flanked by side panels 766 and 768. Side panel 766 could have an inner cavity accessed by a pivotal door which opens allowing the operator to have storage area inside the side panel 766. Side panel 768 is partially occupied by a filler tube (not shown) which is connected to a gas tank situated under the driver's seat bottom 760 and which is closed by the filler cap 772 (FIG. 37). Side panel 768 would also include a top panel 774. As shown, both the side panels 766 and 768 are approximately the same level as seat bottom 760 which allows the operator to use the top of the side panels for sliding in or out of the seat 722 upon ingress or egress. That in combination with the walk through entry, allows easy ingress/egress of the driver, even with the roll cage.

With reference now to FIGS. 38-42, frame 710 will be described in greater detail. As shown best in FIG. 38, frame 710 is comprised of box tube frames 780 and 782, which define the main structure for vehicle 702. Frame 710 includes a rear engine and transmission mount portion 784, a rear suspension mount portion 786 and front suspension mount portion shown generally at 788. As shown, frame 710 mounts an engine 790 and transmission 792 to mount portion 784. Engine 790 is of the type shown and described in Assignee's Ser. No. 61/385,802 filed Sep. 23, 2010, and corresponding PCT application PCT/US2011/52914; the subject matter of which are incorporated herein by reference. Transmission 792, and the mounting of the engine and transmission together, as well as the mounting of the engine 790 and transmission 792 to frame 710 is similar to that shown in either of U.S. patent application Ser. Nos. 12/849,480 or 12/849,516, both of which were filed on Aug. 3, 2010, corresponding PCT application PCT/US2011/46395; the subject matter of which are incorporated herein by reference.

Figure 46:
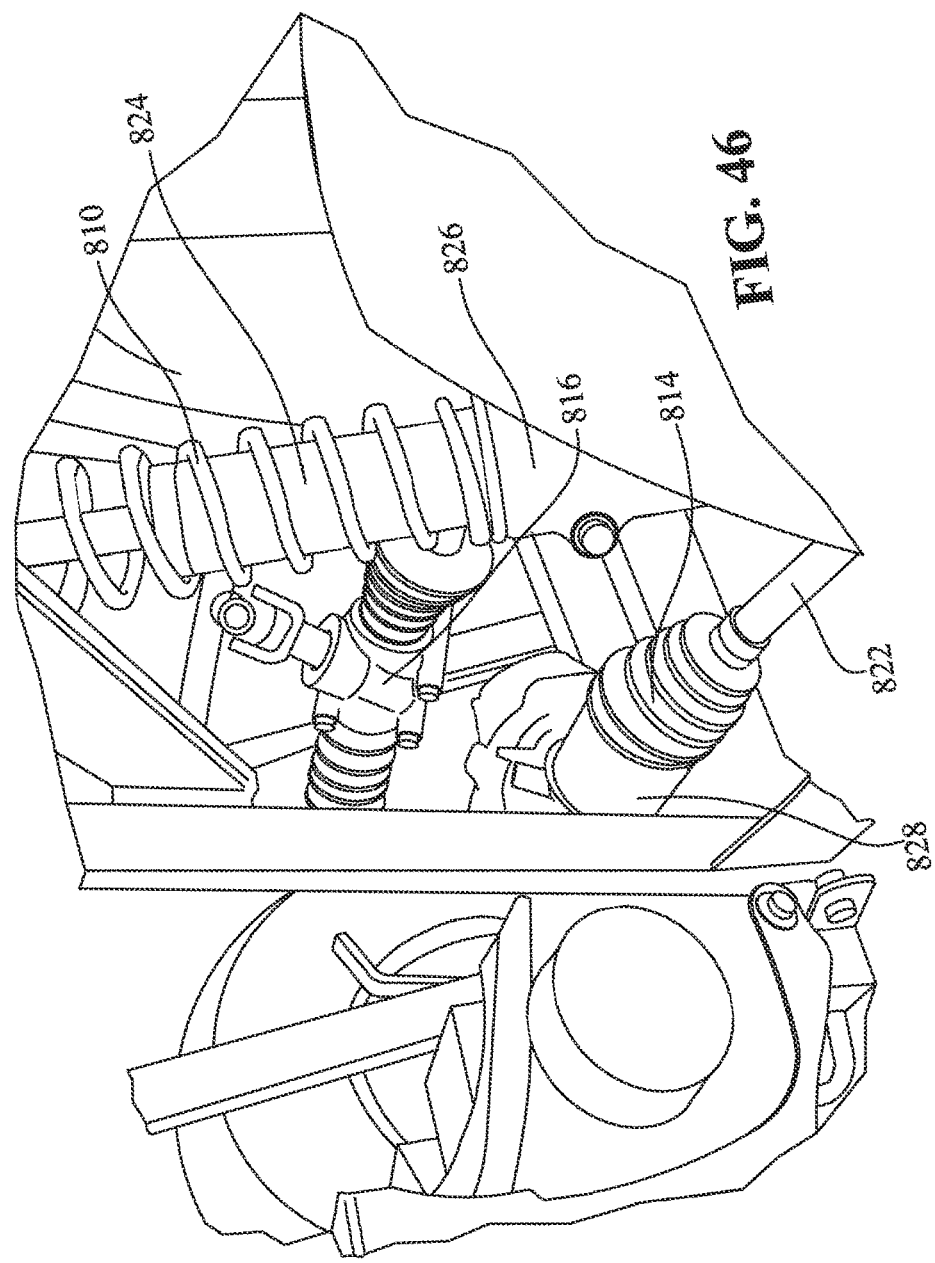
FIG. 46 is a view showing the front suspension and steering system.

As shown in FIGS. 38, 39 and 46, front frame portion 788 is shown with frame tubes 780 and 782 that neck down and support cross beam 800, which is coupled with frame uprights 801 and 802. Strut frame (or shock tower) 806 and frame tubes 808 are also supported by frame tubes 780 and 782. Front frame portion 788 allows mounting of struts 810, suspension arms 812, front differential 814, rack and pinion steering mechanism 816 as well as steering arms 818. A steering post (not shown) extends upwardly from steering mechanism 816 for steering the ATV 702. Half shafts or stub shafts 822 connect front differential 814 to the wheels by way of couplings 828. As shown in FIG. 46, a centerline through couplings 828 is forward of a centerline through wheels 712, 714 and therefore stub shafts 822 extend rearwardly and downwardly to the wheels 712, 714. Struts 810 are comprised of shock absorber portion 824 and hub portion 826, where hub portions 826 rotate relative to shock absorber portions 824.

Figure 40:
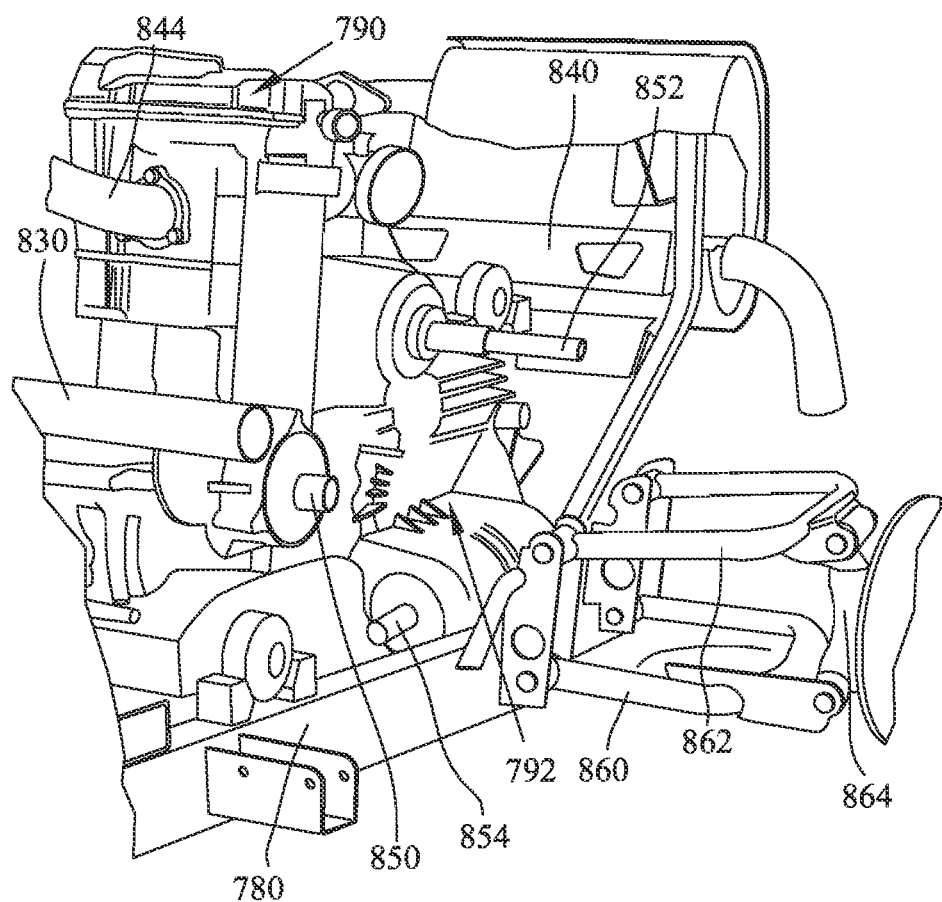
FIG. 40 is a front left perspective view of the frame and engine mount.

With reference now to FIG. 40, the rear mount section 786 includes a frame tube 830 to which brackets of engine 790 are mounted as more fully described in our U.S. application Ser. Nos. 12/849,480 and 12/849,516 as described above. Transmission 792 is also mounted to frame portion 784 (FIG. 38) by way of an isolation mount, again as described in Ser. Nos. 12/849,480 and 12/849,516. As shown in FIG. 40, rear frame portion 784 further includes a rear bracket structure 840 for mounting muffler 842 which is connected to engine by way of exhaust pipe 844. As shown, muffler 842 is positioned in the rear of the vehicle as shown in FIGS. 38 and 40. As mounted, engine and transmission, 790, 792, provide an engine output shaft 850, a transmission input shaft 852 to which a continuously variable transmission (CVT, not shown) would be coupled. This provides a forward output shaft 854 for driving front differential and front wheels, and a rear output shaft (not shown) for driving rear wheels. With reference to FIG. 38, suspension frame mount 786 provides channels 858 for receiving double A-arms 860, 862 to which wheel hubs 864 are mounted.

Figure 41:
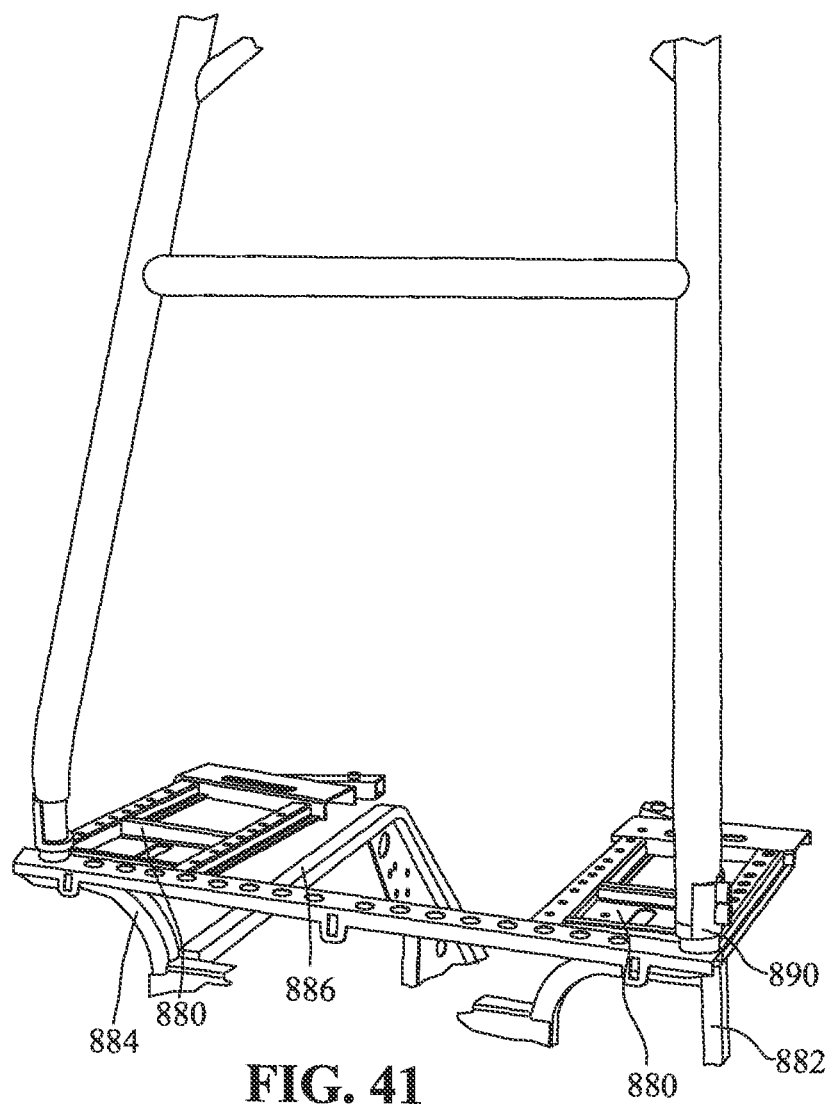
FIG. 41 is a rear perspective view of a portion of the frame.
Figure 42:
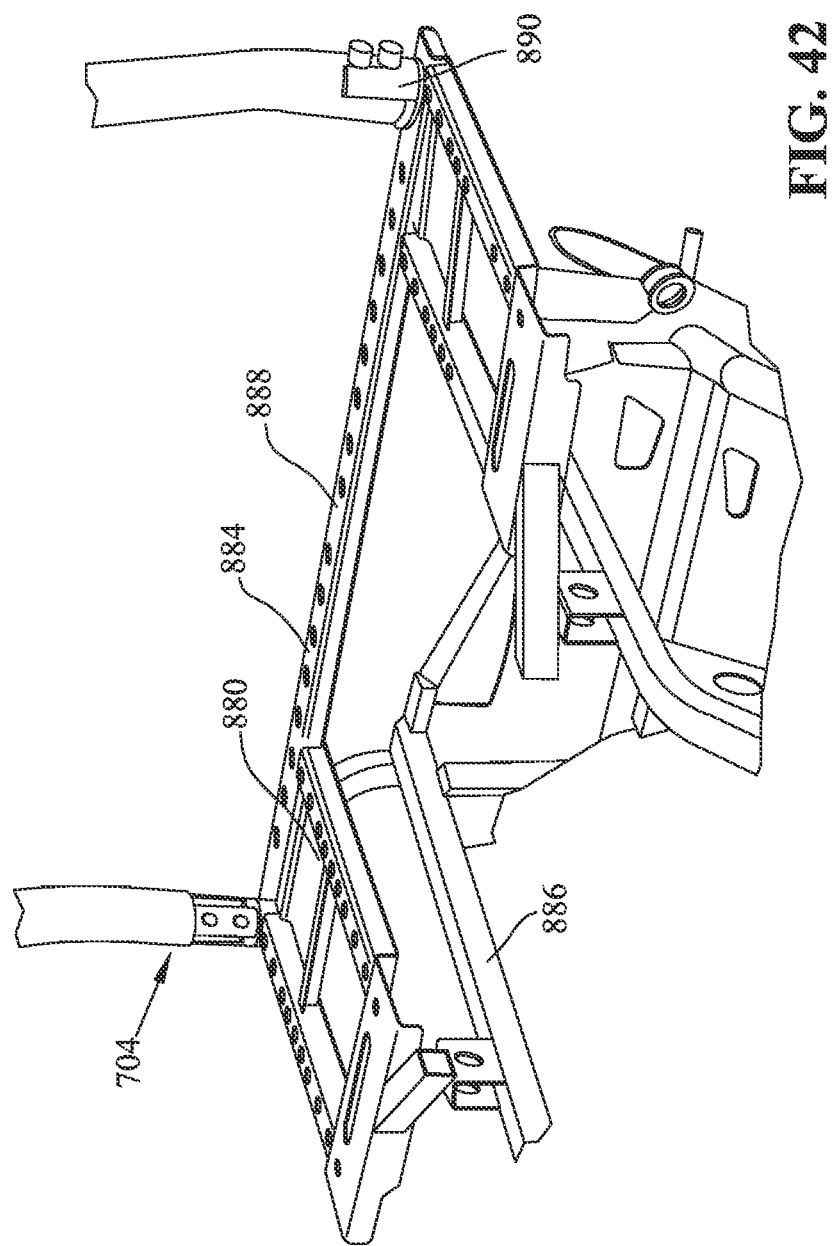
FIG. 42 is an enlarged view of the rear frame section of FIG. 41.

With reference now to FIGS. 41 and 42, upper support pedestals 880 are provided which are supported above frame rails 780 and 782 by bracing such as 882, 884 and 886, and include connector members 890 attached thereto for attachment to roll cage 704.

Figure 43:
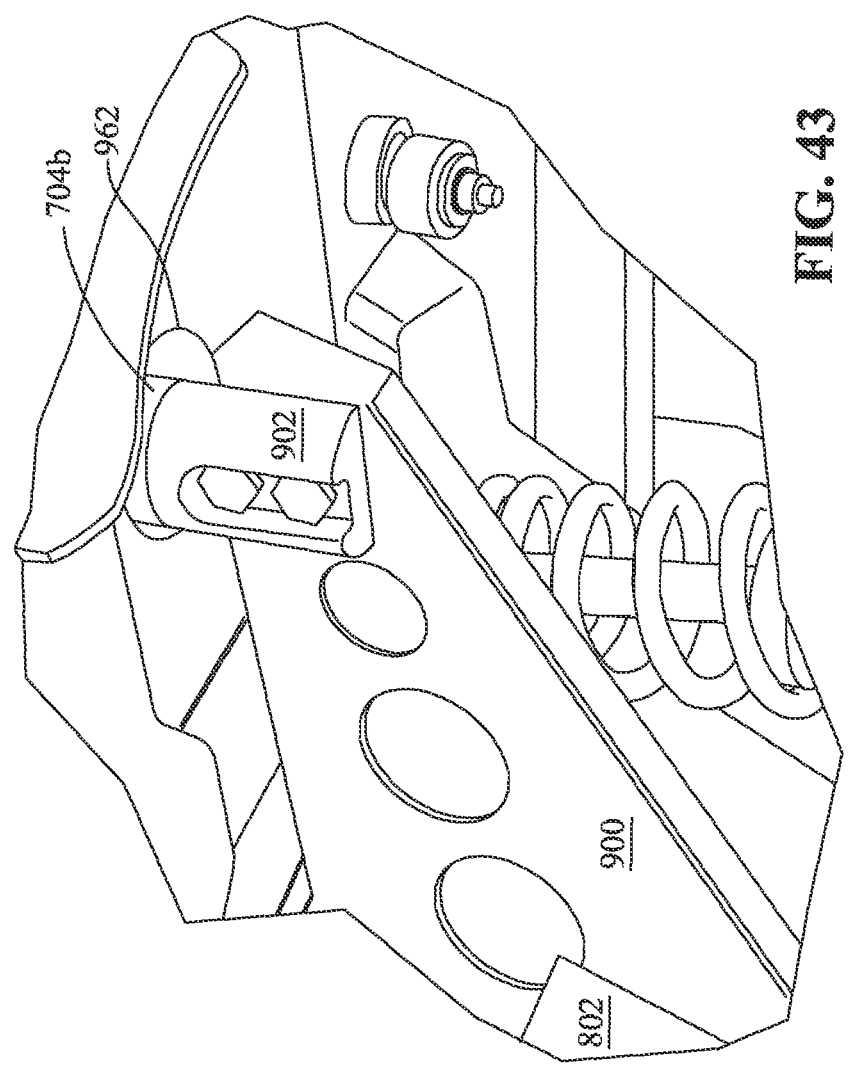
FIG. 43 is an underside view showing the front roll cage mount area.

With reference now to FIG. 43, support bracket 900 is held by upright 802 to support a connector 902 for attachment to the front of roll cage 704. Note that bracket 900 supports roll cage 704 forward of strut 810 as described herein.

Figure 44:
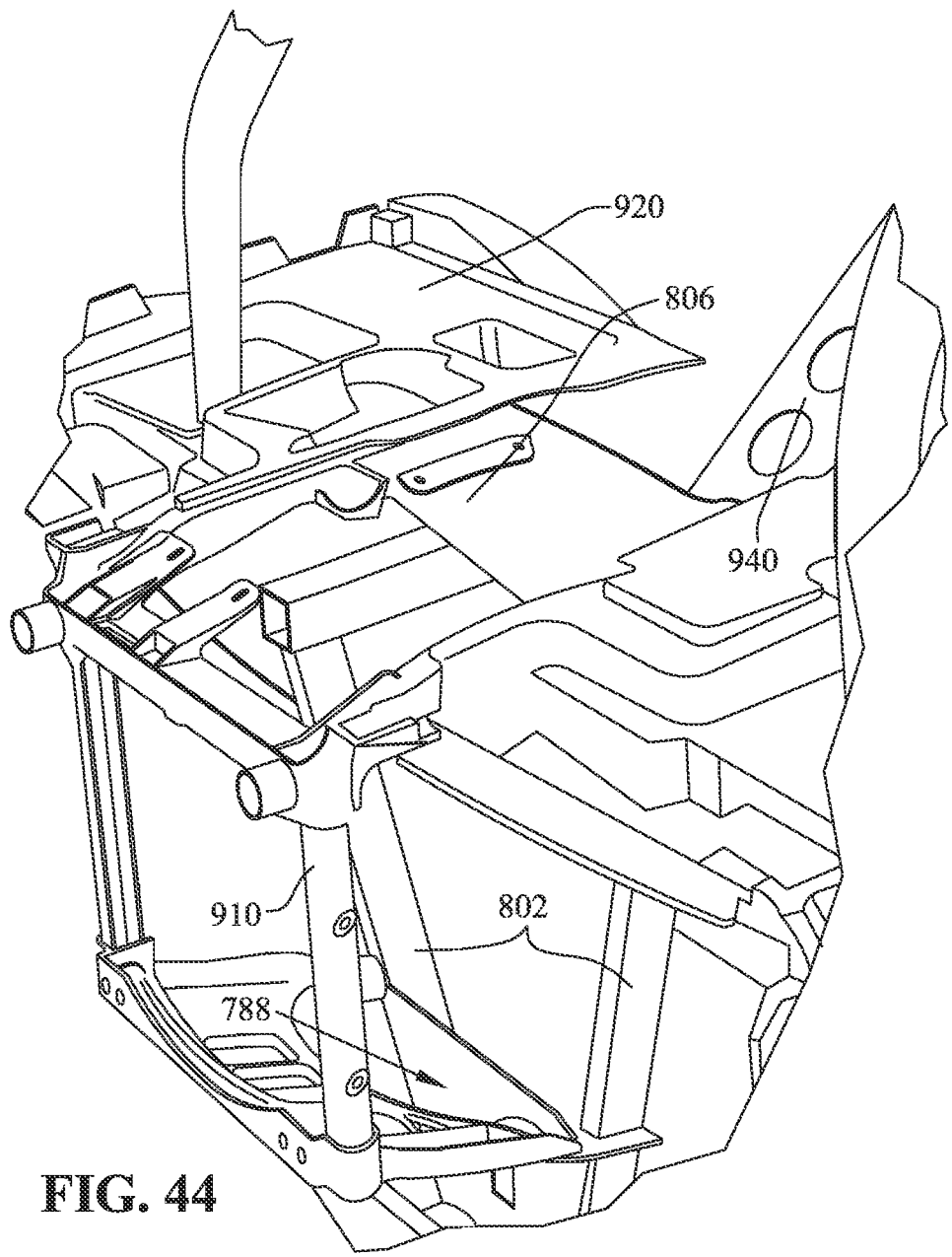
FIG. 44 is an enlarged view of the front frame section.
Figure 45:
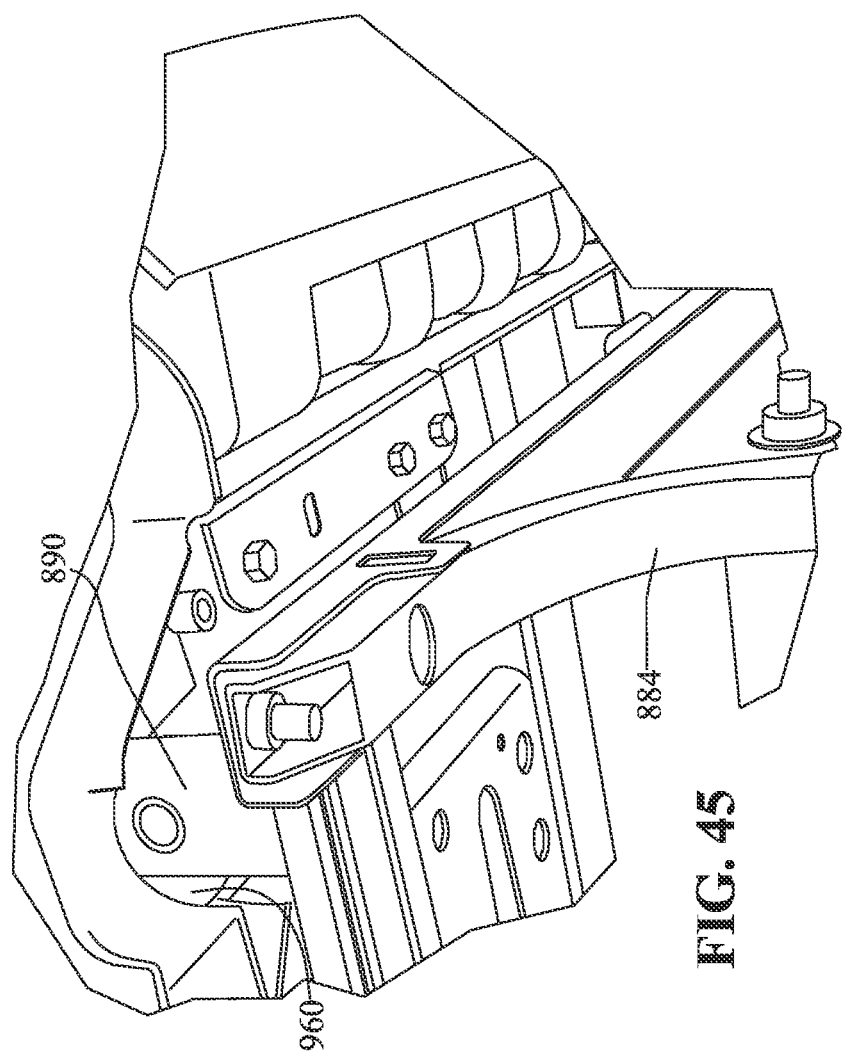
FIG. 45 is an underside perspective view of the rear roll cage mount area.

With reference now to FIG. 44, a front frame casting 910 is provided which may be attached to front frame 788 and in particular to uprights 802 and cross-frame 806. Frame casting 910 provides support for front shroud 920 and front rack 922, as shown in FIGS. 35 and 36.

With reference again to FIGS. 35-37, vehicle 702 also includes a rear utility box 950 supported on a rear of vehicle 702 where a rear portion 704a of roll cage 704 extends downwardly through cargo box 950 (through aperture 960, see FIG. 45) and portion 704b extends downwardly through an aperture 962 of front utility rack 922, see FIGS. 36 and 43. As shown in FIGS. 38 and 40, rear suspension includes a double A-arm suspension having arms 970 and shock 972.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

The invention claimed is:
1. An all-terrain vehicle ("ATV"), comprising:
a frame comprising generally upstanding frame members having a first cross-sectional profile, generally longitudinally extending frame members having a second cross-sectional profile different from the first cross-sectional profile, and a front frame portion extending transversely across a front portion of the generally longitudinally extending frame members, the front frame portion extending beyond the generally longitudinally extending frame members to define first mounting extensions, and the front frame portion coupling together the generally upstanding frame members and the generally longitudinally extending frame members;
a seat supported by the frame;
front and rear wheels supporting the frame;

a drivetrain supported by the frame, and drivingly coupled to the front and rear wheels;

front struts operably coupled to the front wheels having an upper shock absorber portion configured to reciprocate for dampening vertical movement of the ATV and a lower steering portion configured to rotate for steering the ATV;

front lower control arms each having a substantially V shape defining a first inner end, a second inner end coupled to the first inner end with a coupling member, and an outer end, the first and second inner ends being coupled to the frame through the coupling member and the outer end being operably coupled to the front struts;

a mounting member supported by the generally longitudinally extending frame members and having portions extending laterally beyond the generally longitudinally extending frame members to define second mounting extensions, wherein the coupling member of the front lower control arms are pivotally coupled between the first and second mounting extensions;

a front differential driven by the drivetrain and coupled to the front wheels; and stub shafts extending from the front differential to the front wheels and the stub shafts are angled forward to the front wheels.

2. The ATV of claim 1, wherein the front differential is supported by a mounting plate.

3. The ATV of claim 1, wherein the front struts are coupled to the front lower control arms at a lower end of the front struts and are coupled to the frame at an upper end of the front struts.

4. The ATV of claim 3, further comprising a steering mechanism positioned forward of the axial centerline of the front wheels and steeringly coupled to the front struts.

5. The ATV of claim 4, wherein the frame comprises a front bracket, where the steering mechanism is coupled to an inside surface of the front bracket and a winch is coupled to an outside surface of the front bracket.

6. The ATV of claim 4, wherein the front struts pivot about a pivot axis, and the steering mechanism is coupled to the struts by way of steering arms, the steering arms being coupled to the struts at a position forward of the pivot axis.

7. The ATV of claim 5, wherein the hub portion of the front struts are rotatable relative to the shock absorber of the front struts.

8. The ATV of claim 3, further comprising a steering post coupled to the steering mechanism to actuate the steering mechanism, and a front enclosure, with the steering post extending forward of the front enclosure.

9. The ATV of claim 8, wherein the front enclosure extends forwardly to a position proximate an axial centerline of the front wheels.

10. The ATV of claim 9, wherein the front enclosure extends over the front differential.

11. The ATV of claim 1, wherein the wheel base between the axial centerline of the front wheels and an axial centerline of the rear wheels is in the range of 60 to 65inches.

12. The ATV of claim 11, wherein the wheel base is 62 inches.

13. The ATV of claim 8, wherein the front enclosure comprises a floorboard portion which is forward of the seat.

14. The ATV of claim 1, wherein the front frame portion is a channel portion coupled to free ends of the generally longitudinally extending frame members, where a front face of the channel portion faces forwardly and is generally vertically oriented.

15. The ATV of claim 14, wherein the frame further comprises frame tubes coupled to the front face of the channel portion and extending forwardly and upwardly to define the frame.

16. The ATV of claim 1, wherein the first cross-sectional profile defines a circle and the second cross-sectional profile defines a rectangle.

17. An all-terrain vehicle ("ATV"), comprising:
a frame including lower longitudinally-extending members;
a driver seat supported by the frame and generally aligned with the longitudinal centerline of the vehicle;
front wheels supporting the frame and configured to rotate about a front wheel axis;
a steering mechanism supported by the frame and coupled to the front wheels for steering;
a drivetrain supported by the frame, and drivingly coupled to the front and rear wheels;
an operator's compartment extending generally between the seat and a front enclosure; and
a protective canopy supported by the frame and positioned over the operator's compartment, the protective canopy including front upstanding members having a forward end coupled to the frame and a rearward end, a front upper cross member coupled to the rearward end of the front upstanding members, a rear upper cross member positioned rearwardly of the front upper cross member, and rear upstanding members coupled to the rear upper cross member, the rear upstanding members of the protective canopy including a first length angled laterally outwardly from the rear upper cross member and extending to a position laterally beyond the inside edge of the wheels, a second length coupled to the first portion and extending in a vertical direction, and a third length coupled to the second portion and angled laterally inwardly toward the lower longitudinally-extending members of the frame, and the forward and rearward ends of the front upstanding members being positioned rearward of the front wheel axis.

18. The ATV of claim 17, wherein the widest width of the vehicle is the outer dimension of either the front or rear wheels.

19. The ATV of claim 18, wherein the widest width of the vehicle is at the outer dimension of the rear wheels and is less than 48 inches.

20. An all-terrain vehicle ("ATV"), comprising:
a frame comprising main frame members extending generally parallel to a vehicle longitudinal axis, a front frame portion having upright frame portions extending upwardly from the generally longitudinally extending frame members, and a cross frame member extending generally transverse to the vehicle longitudinal axis, the cross frame member being comprised of a tube having a front tube wall and a rear tube wall, and a portion of the front tube wall adjacent each end is cut away to expose the rear tube wall, a length of the rear tube wall being greater than that of the front tube wall along a horizontal plane extending parallel to a ground surface;
a driver seat supported by the generally longitudinally extending frame members and generally aligned with the longitudinal centerline of the vehicle;
front and rear wheels supporting the frame;
a steering mechanism supported by the frame and coupled to the front wheels for steering;
a drivetrain supported by the frame, and drivingly coupled to the front and rear wheels;

an operator's compartment extending generally between the seat and a front enclosure; and a protective canopy supported by the frame, at least a portion of the protective canopy being supported by the rear tube wall of the cross frame member at positions laterally beyond the seat, and the rear tube wall is exposed by the cut away portion of the front tube wall when the protective canopy is supported by the rear tube wall.

21. The ATV of claim 20, wherein the widest width of the vehicle is the outer dimension of either the front or rear wheels.

22. The ATV of claim 21, wherein the widest width of the vehicle is at the outer dimension of the rear wheels and is less than 48 inches.

23. An all-terrain vehicle ("ATV"), comprising:
a frame comprising front longitudinal tube portions;
a single seat supported by the frame;
front and rear wheels supporting the frame, wherein a wheel base between the axial centerline of the front wheels and an axial centerline of the rear wheels is in the range of 60 to 65 inches;
a drivetrain supported by the frame, and drivingly coupled to the front and rear wheels;
an operator's compartment extending generally between the seat and a front enclosure, the front enclosure extending forwardly to a position proximate an axial centerline of the front wheels and having a plurality of walls coupled to the front longitudinal tube portions;
front lower control arms having an inner end and an outer end, the inner end being coupled to the front longitudinal tube portions;
front struts having a shock absorber and a hub portion, the front struts being operably coupled to the front lower control arms at a lower end of the front struts and the frame at an upper end thereof, the shock absorber of the front struts being configured to reciprocate along an axis and the hub portion of the front struts being configured to rotate about the axis;
a front drive coupled to the drivetrain and drivingly coupled to the front wheels;
stub shafts extending from the front drive to the wheels, the stub shafts angling forward to the wheels; and
a steering mechanism positioned forward of the front drive and steeringly coupled to the front struts by way of steering arms, the steering arms being coupled to the struts at a position forward of the axial centerline of the front wheels.

24. The ATV of claim 23, wherein the plurality of walls include left and right side walls and a floor.

25. The ATV of claim 24, wherein the inner ends of the front lower control arms are coupled to the front longitudinal tube portions under the floor.

26. The ATV of claim 23, wherein the steering mechanism is a rack and pinion mechanism.

27. An all-terrain vehicle ("ATV"), comprising:
a frame;
a seat supported by the frame;
front and rear wheels supporting the frame;
a drivetrain supported by the frame, and including a front differential drivingly coupled to the front wheels through a front axle and to the rear wheels through a rear axle;
an operator's compartment extending generally between the seat and a front enclosure, the front enclosure extending forwardly to a position proximate an axial centerline of the front wheels;

a front suspension assembly including:
only a single control arm, the control arm comprising a front lower control arm operably coupled to a right side of the frame,
only a single control arm, the control arm comprising a front lower control arm operably coupled to a left side of the frame, and
front struts having a shock absorber and a hub portion, the front struts being operably coupled to the front lower control arms at a lower end of the front struts and the frame at an upper end thereof, the shock absorber portion of the front struts being configured to reciprocate along an axis and the hub portion of the front struts being configured to rotate about the axis;
a steering mechanism positioned forward of the axial centerline of the front wheels and steeringly coupled to the front struts by way of steering arms, and the steering arms being coupled to the struts at a position forward of the axial centerline of the front wheels, and the steering arms are configured to pivot the front wheels about a pivot axis, where a steering geometry line intersects the pivot axis of the front wheels and a center point of the rear axle, and outer ends of the steering arms are positioned along the steering geometry line; and
stub shafts extending from the front differential to the front wheels and the stub shafts are angled forward to the front wheels.

28. The ATV of claim 27, wherein the steering mechanism comprises a linear actuator with a transverse actuation axis, and the transverse actuation axis is below an upper surface of the front differential.

29. The ATV of claim 27, wherein the steering mechanism is steeringly coupled to the front struts by way of steering arms, the steering arms are coupled to the struts at a position forward of the axis and configured to move transversely.

30. The ATV of claim 27, wherein the frame comprises front longitudinal tube portions and the single front lower control arms are coupled to the front longitudinal tube portions at coupling points.

31. The ATV of claim 30, wherein an operator's compartment extends generally between the seat and a front enclosure, the front enclosure extending forwardly to a position proximate an axial centerline of the front wheels and having a plurality of walls coupled to the front longitudinal tube portions.

32. The ATV of claim 31, wherein the plurality of walls include left and right side walls and a floor.

33. The ATV of claim 32, wherein the inner ends of the front lower control arms are coupled to the front longitudinal tube portions under the floor.

34. The ATV of claim 32, further comprising operator pedals positioned within the operator's compartment, and wherein the left and right side walls extend laterally beyond the coupling points at the right and left sides and extend vertically upwardly to enclose the operator pedals.

35. The ATV of claim 27, wherein a wheel base between the axial centerline of the front wheels and an axial centerline of the rear wheels is in the range of 60 to 65 inches.

36. The ATV of claim 23, wherein, when viewed from the top, the steering arms are generally perpendicular to a longitudinal axis of the ATV when the front wheels are steering straight forward.

37. The ATV of claim 27, wherein, when viewed from the top, the steering arms are generally perpendicular to a longitudinal axis of the ATV when the front wheels are steering straight forward.

\* \* \* \* \*